(12) United States Patent
Rehfeldt et al.

(10) Patent No.: US 12,533,069 B2
(45) Date of Patent: Jan. 27, 2026

(54) SYSTEMS AND METHODS OF ELECTRODE SWITCHING FOR NEUROPHYSIOLOGICAL SENSING AND STIMULATION

(71) Applicant: Cadwell Laboratories, Inc., Kennewick, WA (US)

(72) Inventors: Rose Rehfeldt, Kennewick, WA (US); Ethan Rhodes, Benton City, WA (US); Richard A. Villarreal, West Richland, WA (US); Wayne Dearing, Kennewick, WA (US); James Wadsworth, West Des Moines, IA (US)

(73) Assignee: Cadwell Laboratories, Inc., Kennewick, WA (US)

( * ) Notice: Subject to any disclaimer, the term of this patent is extended or adjusted under 35 U.S.C. 154(b) by 560 days.

(21) Appl. No.: 16/678,582

(22) Filed: Nov. 8, 2019

(65) Prior Publication Data
US 2020/0146573 A1 May 14, 2020

Related U.S. Application Data

(60) Provisional application No. 62/758,303, filed on Nov. 9, 2018.

(51) Int. Cl.
*A61B 5/30* (2021.01)
*A61B 5/00* (2006.01)
(Continued)

(52) U.S. Cl.
CPC .............. *A61B 5/30* (2021.01); *A61B 5/24* (2021.01); *A61B 5/291* (2021.01); *A61B 5/7225* (2013.01);
(Continued)

(58) Field of Classification Search
CPC .. A61B 5/30; A61B 5/291; A61B 5/24; A61B 5/7225; A61B 5/7435; A61B 2562/046; A61N 1/0531; A61N 1/08
(Continued)

(56) References Cited

U.S. PATENT DOCUMENTS 751,475 A 2/1904 De Vilbiss
2,320,709 A 6/1943 Arnesen
(Continued)

FOREIGN PATENT DOCUMENTS

CN 104766176 A 7/2015
DE 102014008684 A1 1/2016
(Continued)

OTHER PUBLICATIONS

Aage R. Møller, "Intraoperative Neurophysiologic Monitoring", University of Pittsburgh, School of Medicine Pennsylvania, © 1995 by Harwood Academic Publishers GmbH.
(Continued)

*Primary Examiner* — Alex M Valvis
*Assistant Examiner* — Chanel J Jhin
(74) *Attorney, Agent, or Firm* — Novel IP

(57) ABSTRACT

An integrated switch matrix for a medical device system used for long-term monitoring of electroencephalogram (EEG) signals and mapping of the brain through cortical stimulation is configured to switch functions of various electrodes associated with the system in response to user needs. The programmable switch matrix is integrated in an EEG recording device and allows for connecting any patient electrode(s) to a ground circuit, connecting any patient electrode to a common reference, connecting a selected common reference to any or all recording device(s) in the
(Continued)

system and, connecting any patient electrode(s) to anode and/or cathode outputs of a neurostimulator for multi-contact cortical stimulation.

14 Claims, 4 Drawing Sheets

(51) Int. Cl.
    *A61B 5/24*     (2021.01)
    *A61B 5/291*     (2021.01)
    *A61N 1/05*     (2006.01)
    *A61N 1/08*     (2006.01)

(52) U.S. Cl.
    CPC .......... *A61B 5/7435* (2013.01); *A61N 1/0531* (2013.01); *A61N 1/08* (2013.01); *A61B 2562/046* (2013.01)

(58) Field of Classification Search
    USPC ........................................................ 600/544
    See application file for complete search history.

(56) References Cited

U.S. PATENT DOCUMENTS

| | | |
|---|---|---|
| 2,807,259 A | 9/1957 | Federico |
| 2,950,437 A | 8/1960 | Stahl |
| 3,165,340 A | 1/1965 | Kuehl |
| 3,659,250 A | 4/1972 | Horton |
| 3,682,162 A | 8/1972 | Colyer |
| 3,985,125 A | 10/1976 | Rose |
| 3,993,859 A | 11/1976 | McNeel |
| 4,155,353 A | 5/1979 | Rea |
| 4,262,306 A | 4/1981 | Renner |
| 4,263,899 A | 4/1981 | Burgin |
| 4,545,374 A | 10/1985 | Jacobson |
| 4,562,832 A | 1/1986 | Wilder |
| 4,616,635 A | 10/1986 | Caspar |
| 4,705,049 A | 11/1987 | John |
| 4,716,901 A | 1/1988 | Jackson |
| 4,743,959 A | 5/1988 | Frederiksen |
| 4,765,311 A | 8/1988 | Kulik |
| 4,817,587 A | 4/1989 | Janese |
| 4,862,891 A | 9/1989 | Smith |
| 4,889,502 A | 12/1989 | Althouse |
| 4,914,508 A | 4/1990 | Music |
| 5,107,845 A | 4/1992 | Guern |
| 5,171,279 A | 12/1992 | Mathews |
| 5,196,015 A | 3/1993 | Neubardt |
| 5,284,153 A | 2/1994 | Raymond |
| 5,284,154 A | 2/1994 | Raymond |
| 5,299,563 A | 4/1994 | Seton |
| 5,377,667 A | 1/1995 | Patton |
| 5,438,989 A | 8/1995 | Hochman |
| 5,462,448 A | 10/1995 | Kida |
| 5,472,426 A | 12/1995 | Bonati |
| 5,474,558 A | 12/1995 | Neubardt |
| 5,540,235 A | 7/1996 | Wilson |
| 5,544,286 A | 8/1996 | Laney |
| 5,560,372 A | 10/1996 | Cory |
| 5,565,779 A | 10/1996 | Arakawa |
| 5,578,060 A | 11/1996 | Pohl |
| 5,601,608 A | 2/1997 | Mouchawar |
| 5,602,585 A | 2/1997 | Dickinson |
| 5,625,759 A | 4/1997 | Freeman |
| 5,648,815 A | 7/1997 | Toba |
| 5,664,029 A | 9/1997 | Callahan |
| 5,681,265 A | 10/1997 | Maeda |
| 5,684,887 A | 11/1997 | Lee |
| 5,728,046 A | 3/1998 | Mayer |
| 5,741,261 A | 4/1998 | Moskovitz |
| 5,766,133 A | 6/1998 | Faisandier |
| 5,772,661 A | 6/1998 | Michelson |
| 5,775,331 A | 7/1998 | Raymond |
| 5,775,931 A | 7/1998 | Jones |
| 5,785,648 A | 7/1998 | Min |
| 5,792,044 A | 8/1998 | Foley |
| 5,795,291 A | 8/1998 | Koros |
| 5,830,150 A | 11/1998 | Palmer |
| 5,847,755 A | 12/1998 | Wixson |
| 5,860,973 A | 1/1999 | Michelson |
| 5,868,668 A | 2/1999 | Weiss |
| 5,885,210 A | 3/1999 | Cox |
| 5,891,147 A | 4/1999 | Moskovitz |
| 5,928,139 A | 7/1999 | Koros |
| 5,928,158 A | 7/1999 | Aristides |
| 5,930,379 A | 7/1999 | Rehg |
| 5,931,777 A | 8/1999 | Sava |
| 5,933,929 A | 8/1999 | Kawakami |
| 5,944,658 A | 8/1999 | Koros |
| 5,954,635 A | 9/1999 | Foley |
| 5,993,385 A | 11/1999 | Johnston |
| 6,004,312 A | 12/1999 | Finneran |
| 6,004,341 A | 12/1999 | Zhu |
| 6,026,180 A | 2/2000 | Wittenstein |
| 6,042,540 A | 3/2000 | Johnston |
| 6,062,216 A | 5/2000 | Corn |
| 6,074,343 A | 6/2000 | Nathanson |
| 6,088,878 A | 7/2000 | Antonucci |
| 6,095,987 A | 8/2000 | Shmulewitz |
| 6,109,948 A | 8/2000 | Kuo |
| 6,116,941 A | 9/2000 | Kuo |
| 6,119,306 A | 9/2000 | Antonucci |
| 6,139,493 A | 10/2000 | Koros |
| 6,152,871 A | 11/2000 | Foley |
| 6,181,961 B1 | 1/2001 | Prass |
| 6,196,969 B1 | 3/2001 | Bester |
| 6,200,331 B1 | 3/2001 | Swartz |
| 6,206,826 B1 | 3/2001 | Mathews |
| 6,210,202 B1 | 4/2001 | Kuo |
| 6,224,545 B1 | 5/2001 | Cocchia |
| 6,236,874 B1 | 5/2001 | Devlin |
| 6,241,548 B1 | 6/2001 | Kuo |
| 6,259,945 B1 | 7/2001 | Epstein |
| 6,264,491 B1 | 7/2001 | Lord |
| 6,266,558 B1 | 7/2001 | Gozani |
| 6,273,740 B1 | 8/2001 | Lord |
| 6,287,322 B1 | 9/2001 | Zhu |
| 6,302,842 B1 | 10/2001 | Auerbach |
| 6,306,100 B1 | 10/2001 | Prass |
| 6,309,349 B1 | 10/2001 | Bertolero |
| 6,325,764 B1 | 12/2001 | Griffith |
| 6,334,068 B1 | 12/2001 | Hacker |
| 6,373,890 B1 | 4/2002 | Freeman |
| 6,425,859 B1 | 7/2002 | Foley |
| 6,450,952 B1 | 9/2002 | Rioux |
| 6,466,817 B1 | 10/2002 | Kaula |
| 6,473,639 B1 | 10/2002 | Fischell |
| 6,500,128 B2 | 12/2002 | Marino |
| 6,535,759 B1 | 3/2003 | Epstein |
| 6,579,114 B2 | 6/2003 | Lord |
| 6,609,018 B2 | 8/2003 | Cory |
| 6,712,795 B1 | 3/2004 | Cohen |
| 6,799,931 B2 | 10/2004 | Kwilosz |
| 6,805,668 B1 | 10/2004 | Cadwell |
| 6,837,716 B1 | 1/2005 | Brazas |
| 6,847,849 B2 | 1/2005 | Mamo |
| 6,851,430 B2 | 2/2005 | Tsou |
| 6,869,301 B2 | 3/2005 | Shimizu |
| 6,870,109 B1 | 3/2005 | Villarreal |
| 6,926,728 B2 | 8/2005 | Zucherman |
| 6,945,933 B2 | 9/2005 | Branch |
| 7,072,521 B1 | 7/2006 | Cadwell |
| 7,089,059 B1 | 8/2006 | Pless |
| 7,104,965 B1 | 9/2006 | Jiang |
| 7,177,677 B2 | 2/2007 | Kaula |
| 7,214,197 B2 | 5/2007 | Prass |
| 7,230,688 B1 | 6/2007 | Villarreal |
| 7,261,688 B2 | 8/2007 | Smith |
| 7,374,448 B2 | 5/2008 | Jepsen |
| 7,470,236 B1 | 12/2008 | Kelleher |
| 7,522,953 B2 | 4/2009 | Kaula |
| 7,713,210 B2 | 5/2010 | Byrd |

(56) References Cited

U.S. PATENT DOCUMENTS

| | | |
|---|---|---|
| 7,801,601 B2 | 9/2010 | Maschino |
| 7,914,350 B1 | 3/2011 | Bozich |
| 7,963,927 B2 | 6/2011 | Kelleher |
| 7,983,761 B2 | 7/2011 | Giuntoli |
| 8,147,421 B2 | 4/2012 | Farquhar |
| 8,160,694 B2 | 4/2012 | Salmon |
| 8,192,437 B2 | 6/2012 | Simonson |
| D670,656 S | 11/2012 | Jepsen |
| 8,323,208 B2 | 12/2012 | Davis |
| 8,439,703 B2 | 5/2013 | Natoli |
| 8,876,813 B2 | 11/2014 | Min |
| 8,942,797 B2 | 1/2015 | Bartol |
| 8,958,869 B2 | 2/2015 | Kelleher |
| 9,084,551 B2 | 7/2015 | Brunnett |
| 9,138,586 B2 | 9/2015 | Eiger |
| 9,155,503 B2 | 10/2015 | Cadwell |
| 9,295,401 B2 | 3/2016 | Cadwell |
| 9,352,153 B2 | 5/2016 | Van Dijk |
| 9,730,634 B2 | 8/2017 | Cadwell |
| 10,238,467 B2 | 3/2019 | Cadwell |
| 2001/0049510 A1 | 12/2001 | Burr |
| 2002/0007188 A1 | 1/2002 | Arambula |
| 2002/0009916 A1 | 1/2002 | Lord |
| 2002/0088098 A1 | 7/2002 | Bouley |
| 2002/0095080 A1 | 7/2002 | Cory |
| 2003/0045808 A1 | 3/2003 | Kaula |
| 2003/0074033 A1 | 4/2003 | Pless |
| 2004/0030258 A1 | 2/2004 | Williams |
| 2004/0127810 A1 | 7/2004 | Sackellares |
| 2004/0192100 A1 | 9/2004 | Shimizu |
| 2005/0003682 A1 | 1/2005 | Brazas |
| 2005/0075578 A1 | 4/2005 | Gharib |
| 2005/0085743 A1 | 4/2005 | Hacker |
| 2005/0148927 A1 | 7/2005 | Ludin |
| 2005/0182454 A1 | 8/2005 | Gharib |
| 2005/0182456 A1 | 8/2005 | Ziobro |
| 2005/0277844 A1 | 12/2005 | Strother |
| 2006/0009754 A1 | 1/2006 | Boese |
| 2006/0085048 A1 | 4/2006 | Cory |
| 2006/0085049 A1 | 4/2006 | Cory |
| 2006/0122514 A1 | 6/2006 | Byrd |
| 2006/0135877 A1 | 6/2006 | Giftakis |
| 2006/0258951 A1 | 11/2006 | Bleich |
| 2006/0276720 A1 | 12/2006 | McGinnis |
| 2007/0016097 A1 | 1/2007 | Farquhar |
| 2007/0021682 A1 | 1/2007 | Gharib |
| 2007/0032841 A1 | 2/2007 | Urmey |
| 2007/0046471 A1 | 3/2007 | Nyalamadugu |
| 2007/0049962 A1 | 3/2007 | Marino |
| 2007/0184422 A1 | 8/2007 | Takahashi |
| 2007/0202005 A1 | 8/2007 | Maschke |
| 2008/0027507 A1 | 1/2008 | Bijelic |
| 2008/0058606 A1 | 3/2008 | Miles |
| 2008/0065144 A1 | 3/2008 | Marino |
| 2008/0071191 A1 | 3/2008 | Kelleher |
| 2008/0082136 A1 | 4/2008 | Gaudiani |
| 2008/0097164 A1 | 4/2008 | Miles |
| 2008/0108244 A1 | 5/2008 | Jepsen |
| 2008/0167574 A1 | 7/2008 | Farquhar |
| 2008/0183096 A1 | 7/2008 | Snyder |
| 2008/0194970 A1 | 8/2008 | Steers |
| 2008/0269777 A1 | 10/2008 | Appenrodt |
| 2008/0281313 A1 | 11/2008 | Fagin |
| 2008/0312520 A1 | 12/2008 | Rowlandson |
| 2009/0018399 A1 | 1/2009 | Martinelli |
| 2009/0043221 A1* | 2/2009 | Kaplan ............... A61B 5/6843 600/544 |
| 2009/0088660 A1 | 4/2009 | McMorrow |
| 2009/0105604 A1 | 4/2009 | Bertagnoli |
| 2009/0177112 A1 | 7/2009 | Gharib |
| 2009/0196471 A1 | 8/2009 | Goetz |
| 2009/0204016 A1 | 8/2009 | Gharib |
| 2009/0209879 A1 | 8/2009 | Kaula |
| 2009/0259108 A1 | 10/2009 | Miles |
| 2009/0279767 A1 | 11/2009 | Kukuk |
| 2010/0036384 A1 | 2/2010 | Gorek |
| 2010/0106011 A1 | 4/2010 | Byrd |
| 2010/0113898 A1 | 5/2010 | Kim |
| 2010/0152604 A1 | 6/2010 | Kaula |
| 2010/0168603 A1 | 7/2010 | Himes |
| 2010/0191305 A1 | 7/2010 | Imran |
| 2010/0249638 A1 | 9/2010 | Liley |
| 2010/0286554 A1 | 11/2010 | Davis |
| 2010/0317931 A1 | 12/2010 | Sarkela |
| 2010/0317989 A1 | 12/2010 | Gharib |
| 2011/0082383 A1 | 4/2011 | Cory |
| 2011/0184308 A1 | 7/2011 | Kaula |
| 2011/0295579 A1 | 12/2011 | Tang |
| 2011/0313530 A1 | 12/2011 | Gharib |
| 2012/0003862 A1 | 1/2012 | Newman |
| 2012/0046531 A1* | 2/2012 | Hua .................. A61N 1/0539 607/45 |
| 2012/0071779 A1 | 3/2012 | Sarkela |
| 2012/0109000 A1 | 5/2012 | Kaula |
| 2012/0109004 A1 | 5/2012 | Cadwell |
| 2012/0209082 A1 | 8/2012 | Al-Ali |
| 2012/0209346 A1 | 8/2012 | Bikson |
| 2012/0220891 A1 | 8/2012 | Kaula |
| 2012/0238855 A1 | 9/2012 | Lanning |
| 2012/0238893 A1 | 9/2012 | Farquhar |
| 2012/0265040 A1 | 10/2012 | Ito |
| 2012/0296230 A1 | 11/2012 | Davis |
| 2013/0012880 A1 | 1/2013 | Blomquist |
| 2013/0109996 A1 | 5/2013 | Turnbull |
| 2013/0138010 A1 | 5/2013 | Nierenberg |
| 2013/0152657 A1 | 6/2013 | Swinehart |
| 2013/0204315 A1 | 8/2013 | Wongsarnpigoon |
| 2013/0253447 A1 | 9/2013 | Ball |
| 2013/0253611 A1* | 9/2013 | Lee .................. A61N 1/36142 607/59 |
| 2013/0304407 A1 | 11/2013 | George |
| 2014/0121555 A1 | 5/2014 | Scott |
| 2014/0275926 A1 | 9/2014 | Scott |
| 2014/0276181 A1 | 9/2014 | Sun |
| 2014/0276925 A1* | 9/2014 | Alves ................ A61B 17/3401 606/129 |
| 2015/0150512 A1 | 6/2015 | Warner |
| 2015/0230749 A1 | 8/2015 | Gharib |
| 2015/0238106 A1* | 8/2015 | Lappalainen .......... A61B 5/398 600/383 |
| 2015/0351643 A1 | 12/2015 | Edwards |
| 2015/0372433 A1 | 12/2015 | Lisogurski |
| 2016/0000382 A1 | 1/2016 | Jain |
| 2016/0174861 A1 | 6/2016 | Cadwell |
| 2016/0270679 A1 | 9/2016 | Mahon |
| 2016/0328991 A1 | 11/2016 | Simpson |
| 2017/0056663 A1* | 3/2017 | Kaemmerer ....... A61N 1/36064 |
| 2017/0100047 A1 | 4/2017 | Edwards |
| 2017/0135640 A1* | 5/2017 | Gunasekar .......... A61B 5/6843 |
| 2018/0117309 A1 | 5/2018 | Rapoport |
| 2018/0140829 A1* | 5/2018 | Ramos de Miguel, Sr. ................ A61N 1/36038 |
| 2018/0161123 A1 | 6/2018 | Cadwell |
| 2018/0198218 A1 | 7/2018 | Regan |
| 2018/0256097 A1 | 9/2018 | Bray |
| 2018/0296277 A1 | 10/2018 | Schwartz |
| 2019/0190187 A1 | 6/2019 | Fukazawa |
| 2020/0022603 A1 | 1/2020 | Cardenas |
| 2020/0108246 A1 | 4/2020 | Cadwell |
| 2020/0297282 A1 | 9/2020 | Batzer |
| 2020/0330772 A1 | 10/2020 | Hartmann-Bax |

FOREIGN PATENT DOCUMENTS

| | | |
|---|---|---|
| EP | 298268 | 1/1989 |
| EP | 0863719 A1 | 9/1998 |
| EP | 890341 | 1/1999 |
| EP | 972538 | 1/2000 |
| EP | 1182965 B1 | 3/2002 |
| EP | 2173238 A2 | 4/2010 |
| JP | H11513592 A | 11/1999 |
| JP | 2008546509 A | 12/2008 |
| WO | 2000038574 A1 | 7/2000 |

(56) References Cited

FOREIGN PATENT DOCUMENTS

| WO | 2000066217 A1 | 11/2000 |
|---|---|---|
| WO | 2001037728 A1 | 5/2001 |
| WO | 2003005887 A2 | 1/2003 |
| WO | 2005030318 A1 | 4/2005 |
| WO | 2006042241 A2 | 4/2006 |
| WO | 2016028822 A1 | 2/2016 |
| WO | 2016105571 A1 | 6/2016 |

OTHER PUBLICATIONS

Clements, et al., "Evoked and Spontaneous Electromyography to Evaluate Lumbosacral Pedicle Screw Placement", 21 (5):600-604 (1996).
Danesh-Clough, et al., "The Use of Evoked EMG in Detecting Misplaced Thoracolumbar Pedicle Screws", 26(12):1313-1316 (2001).
Dezawa et al., "Retroperitoneal Laparoscopic Lateral Approach to the Lumbar Spine: A New Approach, Technique, and Clinical Trial", Journal of Spinal Disorders 13(2):138-143 (2000).
Dickman, et al., "Techniques in Neurosurgery", National Library of Medicine, 3 (4) 301-307 (1997).
Epstein, et al., "Evaluation of Intraoperative Somatosensory-Evoked Potential Monitoring During 100 Cervical Operations", 18(6):737-747 (1993), J.B. Lippincott Company.
Glassman, et al., "A Prospective Analysis of Intraoperative Electromyographic Monitoring of Pedicle Screw Placement with Computed Tomographic Scan Confirmation", 20(12):1375-1379.
Goldstein, et al., "Minimally Invasive Endoscopic Surgery of the Lumbar Spine", Operative Techniques in Orthopaedics, 7 (1):27-35 (1997).
Greenblatt, et al., "Needle Nerve Stimulator-Locator", 41 (5):599-602 (1962).
H.M. Mayer, "Minimally Invasive Spine Surgery, A Surgical Manual", Chapter 12, pp. 117-131 (2000).
Hinrichs, et al., "A trend-detection algorithm for intraoperative EEG monitoring", Med. Eng. Phys. 18 (8):626-631 (1996).
Bergey et al., "Endoscopic Lateral Transpsoas Approach to the Lumbar Spine", Spine 29 (15):1681-1688 (2004).
Holland, "Spine Update, Intraoperative Electromyography During Thoracolumbar Spinal Surgery", 23 (17):1915-1922 (1998).
Holland, et al., "Continuous Electromyographic Monitoring to Detect Nerve Root Injury During Thoracolumbar Scoliosis Surgery", 22 (21):2547-2550 (1997), Lippincott-Raven Publishers.
Hovey, A Guide to Motor Nerve Monitoring, pp. Mar. 1-31, 20, 1998, The Magstim Company Limited.
Kevin T. Foley, et al., "Microendoscipic Discectomy" Techniques in Neurosurgery, 3:(4):301-307, © 1997 Lippincott-Raven Publishers, Philadelphia.
Kossmann et al., "The use of a retractor system (SynFrame) for open, minimal invasive reconstruction of the anterior column of the thoracic and lumbar spine", 10:396-402 (2001).
Kossmann, et al., "Minimally Invasive Vertebral Replacement with Cages in Thoracic and Lumbar Spine", European Journal of Trauma, 2001, No. 6, pp. 292-300.
Lenke, et al., "Triggered Electromyographic Threshold for Accuracy of Pedicle Screw Placement, An Animal Model and Clinical Correlation", 20 (14):1585-1591 (1995).
Lomanto et al., "7th World Congress of Endoscopic Surgery" Singapore, Jun. 1-4, 2000 Monduzzi Editore S.p.A.; email: monduzzi@monduzzi.com, pp. 97-103 and 105-111.
MaGuire, et al., "Evaluation of Intrapedicular Screw Position Using Intraoperative Evoked Electromyography", 20 (9):1068-1074 (1995).
Mathews et al., "Laparoscopic Discectomy With Anterior Lumbar Interbody Fusion, A Preliminary Review", 20 (16):1797-1802, (1995), Lippincott-Raven Publishers.
Bertagnoli, et al., "The AnteroLateral transPsoatic Approach (ALPA), A New Technique for Implanting Prosthetic Disc-Nucleus Devices", 16 (4):398-404 (2003).

Michael R. Isley, et al., "Recent Advances in Intraoperative Neuromonitoring of Spinal Cord Function: Pedicle Screw Stimulation Techniques", Am. J. End Technol. 37:93-126 (1997).
Minahan, et al., "The Effect of Neuromuscular Blockade on Pedicle Screw Stimulation Thresholds" 25(19):2526-2530 (2000).
Pimenta et al., "Implante de prótese de núcleo pulposo: análise inicial", J Bras Neurocirurg (2):93-96, (2001).
Raymond J. Gardocki, MD, "Tubular diskectomy minimizes collateral damage", AAOS Now, Sep. 2009 Issue, http://www.aaos.org/news/aaosnow/sep09/clinical12.asp.
Raymond, et al., "The NerveSeeker: A System for Automated Nerve Localization", Regional Anesthesia 17:151-162 (1992).
Reidy, et al., "Evaluation of electromyographic monitoring during insertion of thoracic pedicle screws", British Editorial Society of Bone and Joint Surgery 83 (7):1009-1014, (2001).
Rose et al., "Persistently Electrified Pedicle Stimulation Instruments in Spinal Instrumentation: Technique and Protocol Development", Spine: 22(3): 334-343 (1997).
Teresa Riordan "Patents; A businessman invents a device to give laparoscopic surgeons a better view of their work", New York Times www.nytimes.com/2004/29/business/patents-businessman-invents-device-give-la (Mar. 2004).
Toleikis, et al., "The usefulness of Electrical Stimulation for Assessing Pedicle Screw Placements", Journal of Spinal Disorders, 13 (4):283-289 (2000).
U.Schick, et al., "Microendoscipic lumbar discectomy versus open surgery: an intraoperative EMG study", pp. 20-26, Published online: Jul. 31, 2001 © Springer-Verlag 2001.
Bose, et al., "Neurophysiologic Monitoring of Spinal Nerve Root Function During Instrumented Posterior Lumbar Spine Surgery", 27 (13):1440-1450 (2002).
Vaccaro, et al., "Principles and Practice of Spine Surgery", Mosby, Inc. © 2003, Chapter 21, pp. 275-281.
Vincent C. Traynelis, "Spinal arthroplasty", Neurosurg Focus 13 (2):1-7. Article 10, (2002).
Welch, et al., "Evaluation with evoked and spontaneous electromyography during lumbar instrumentation: a prospective study", J Neurosurg 87:397-402, (1997).
Zouridakis, et al., "A Concise Guide to Intraoperative Monitoring", Library of Congress card No. 00-046750, Chapter 3, p. 21, chapter 4, p. 58 and chapter 7 pp. 119-120.
Medtronic, "Nerve Integrity Monitor, Intraoperative EMG Monitor, User's Guide", Medtronic Xomed U.K. Ltd., Unit 5, West Point Row, Great Park Road, Almondsbury, Bristol B5324QG, England, pp. 1-39.
Chapter 9, "Root Finding and Nonlinear Sets of Equations", Chapter 9:350-354, http://www.nr.com.
Digitimer Ltd., 37 Hydeway, Welwyn Garden City, Hertfordshire. AL7 3BE England, email:sales@digitimer.com, website: www.digitimer.com, "Constant Current High Voltage Stimulator, Model DS7A, for Percutaneous Stimulation of Nerve and Muscle Tissue".
Ford et al., 'Electrical characteristics of peripheral nerve stimulators, implications for nerve localization, Dept. of Anesthesia, University of Cincinnati College of Medicine, Cincinnati, OH 45267, pp. 73-77.
Deletis et al., "The role of intraoperative neurophysiology in the protection or documentation of surgically induced injury to the spinal cord", Correspondence Address: Hyman Newman Institute for Neurology & Neurosurgery, Beth Israel Medical Center, 170 East End Ave., Room 311, NY 10128.
Urmey "Using the nerve stimulator for peripheral or plexus nerve blocks" Minerva Anesthesiology 2006; 72:467-71.
Butterworth et al., "Effects of Halothane and Enflurane on Firing Threshold of Frog Myelinated Axon", Journal of Physiology 411:493-516, (1989) From the Anesthesia Research Labs, Brigham and Women's Hospital, Harvard Medical School, 75 Francis St., Boston, MA 02115, jp.physoc.org.
Calancie, et al., "Threshold-level multipulse transcranial electrical stimulation of motor cortex for intraoperative monitoring of spinal motor tracts: description of method and comparison to somatosensory evoked potential monitoring" J Neurosurg 88:457-470 (1998).

(56) References Cited

OTHER PUBLICATIONS

Calancie, et al., "Threshold-level repetitive transcranial electrical stimulation for intraoperative monitoring of central motor conduction", J. Neurosurg 95:161-168 (2001).
Calancie, et al., Stimulus-Evoked EMG Monitoring During Transpedicular Lumbosacral Spine Instrumentation, Initial Clinical Results, 19 (24):2780-2786 (1994).
Carl T. Brighton, "Clinical Orthopaedics and Related Research", Clinical Orthopaedics and related research No. 384, pp. 82-100 (2001).
International Search Report for PCT/US2019/063793, Feb. 19, 2020.
International Search Report for PCT/US2017/062559, Jan. 26, 2018.
Brainstorm Website, http://neuroimage.usc.edu/brainstorm/ accessed online Oct. 9, 2021, available online Apr. 11, 2018. (Year: 2018).
Compumedics Website, "Compumedics Profusion EEG 4" accessed online Oct. 9, 2021, available online Feb. 23, 2017 (ttps://www.compumedics.com.au/wp-content/uploads/2016/08/ AD125-02-Profusion-EEG4-brochureLR.pdf (Year:2017).
Intelimed Website, "Compumedics Profusion EEG 5 Top Features" accessed online Oct. 9, 2021, available online Sep. 30, 2014 2014).
Deff Corporation, No more confusion about which direction to plug in. A USB cable that can be plugged in both ways is now available. A connector is equipped with an LED indicator to check a charging status of a smartphone. Nov. 6, 2015 (Dec. 28, 2021 Search) Internet URL:https://deff.co.jp/news/dca-mbled (Document showing known technology).
"Long, S; "Phase Locked Loop Circuits", Apr. 27, 2005". (Year: 2005).
Brainstorm website, https://web.archive.org/web/20180421074035/ https://neuroimage.usc.edu/brainstorm/Tutorials/MontageEditor, available online Apr. 21, 2018 (Year: 2018).
Brainstorm website, https://web.archive.org/web/20180330235454/ http://neuroimage.usc.edu/brainstorm/Tutorials/CreateProtocol,) available on Mar. 30, 2018 (Year: 2018).
Brainstorm website,https://web.archive.org/web/20180416072211/ http://neuroimage.usc.edu/brainstorm/Screenshots ,available on Apr. 16, 2018 (Year: 2018).
Brainstorm website,https://web.archive.org/web/20180411211909/ https://neuroimage.usc.edu/brainstorm/Introduction,available on Apr. 11, 2018 (Year: 2018).
Brainstorm website,https://web.archive.org/web/20180505021718/ https://neuroimage.usc.edu/brainstorm/Tutorials/Epileptogenicity, available on May 5, 2018 (Year: 2018).

* cited by examiner

SYSTEMS AND METHODS OF ELECTRODE SWITCHING FOR NEUROPHYSIOLOGICAL SENSING AND STIMULATION

CROSS-REFERENCE

The present application relies on U.S. Patent Provisional Application No. 62/758,303, entitled "Systems and Methods of Electrode Switching for Neurophysiological Sensing and Stimulation" and filed on Nov. 9, 2018, for priority, which is herein incorporated by reference in its entirety.

FIELD

The present specification is related generally to the field of neurophysiological sensing and/or stimulation. More specifically, the present specification is related to an integrated switch matrix for a medical device system used for long-term monitoring of bioelectrical signals and/or mapping of the brain through cortical stimulation.

BACKGROUND

Electroencephalography is the neurophysiologic sensing and measurement of electrical activity of the brain by recording signals acquired from electrodes, which may be placed on the scalp, intracranially, on the surface of the brain, or within the brain tissue, and connected to an amplifier or recording device. The resulting traces are known as an electroencephalogram (EEG) and represent an electrical signal (postsynaptic potentials) from a large number of neurons.

Long-term electroencephalographic monitoring (LTM), intracranial EEG (iEEG) and cortical stimulation mapping (CSM) are directed towards identifying, mapping and monitoring neural structures in the brain with the goal of locating areas of the brain where epileptic seizures are occurring and preserving the structural integrity of these neural structures during physically invasive procedures such as surgery. For example, cortical stimulation mapping (CSM) is a type of electrocorticography that involves a physically invasive procedure and aims to localize the function of specific brain regions through direct electrical stimulation of the cerebral cortex. Identifying, mapping and monitoring neural structures comprises applying electrical stimulation at or near an area of the brain where EEG abnormalities associated with seizure disorders are believed to be located. Electrical stimulation is transmitted through the brain to excite the associated sensory, motor or functional areas of the cerebral cortex that may reside in the location of interest. An electrical impulse is generated in the brain, as a result of the excitation, that can be sensed using recording electrodes or by visually observing physical responses in the patient such as limb movement or speech patterns, thereby indicating presence of a nerve center to a surgeon.

Electrocorticography (ECoG) and stereoelectroencephalography (sEEG) are methods of intracranial EEG monitoring and cortical mapping that require high channel count recording and stimulating devices. These systems use amplifiers capable of receiving input electrodes typically in a range of 21 to 256 electrodes and sometimes more than 500 electrodes. In ECoG, electrodes are placed on the cerebral cortex via a craniotomy. In sEEG, depth electrodes may be placed via small holes (burr holes) drilled in the skull. ECoG and sEEG may be used when standard EEG monitoring results are inconclusive, particularly for epilepsy patients. Since ECoG and sEEG use strip or grid electrodes and depth electrodes on the surface of the brain and in the brain respectively, they provide a benefit of using electrodes that are closer to the area(s) producing seizures than electrodes placed on the scalp in standard EEG monitoring. In addition, electrodes placed directly on or in the brain have the advantage of recording signals without the interference of skin, fat tissue, muscle or bone.

ECoG and sEEG may be used to monitor, assess and map the brains of epilepsy patients who may benefit from surgery and have not responded to less invasive treatments, including pharmaceuticals. Monitoring will indicate to physicians an area of epileptogenic brain tissue that is the site of origin of recurrent seizures and mapping will indicate to physicians functional areas of the brain to be safeguarded during surgery. Functional mapping involves using the electrodes (grid or strip) to stimulate the brain and record signals to identify the underlying function of a brain region, such as language, sensation, or motor function. ECoG and sEEG typically involve long term monitoring where electrodes are placed intracranially during a surgery, then the monitoring device remains connected to the patient for monitoring and recording to identify areas of pathological brain activity. Once the area of epileptic activity is located, the device may be used during surgery or in a patient monitoring room to monitor or stimulate nerves to map important functional areas of the brain that should be avoided during surgery. When a discrete epileptogenic region of the brain is identified and can be removed without the introduction of unacceptable additional neurological deficits, the respective surgery is performed.

Conventional high channel-count systems deploying multiple amplifier or recording devices as part of a sensing system and at least one neurostimulator as part of a stimulation system require separate controls and are fraught with unwanted complexities arising from multiple cables that are a source of unwanted electrical noise and constrain patient movement.

Additionally, legacy large channel-count systems with multiple recording devices use electrode wires to attach the common reference inputs on each device to each other and to the patient. These connections are prone to breakage or can become disconnected due to movement of the equipment and/or the patient, particularly during a seizure. As a result, these systems require manual intervention by a user to replace or physically move a bad or noisy common reference lead.

Furthermore, in such legacy systems, a single electrode contact is chosen for a ground connection and plugged into a single touch-proof jack dedicated to patient ground on a recording device. Limiting the user to one dedicated touch-proof jack for the ground connection affects reliability and maneuverability of connection. If the ground electrode breaks or becomes disconnected from the device, the user has to manually connect another electrode or reconnect the disconnected lead wire to the device.

Finally, typical CSM procedures require the repeated disconnection of a current pair of stimulation electrodes and the connection of a new pair until an area of interest is mapped. In other words, the user has to repeatedly deal with the problem of having to physically move the neurostimulator outputs to other locations on the patient.

Thus, there is a need for systems and methods that provide a versatility of operation and functions by integrating sensing and stimulation modalities. There is also a need for systems and methods that enable a user to overcome a variety of manual interventions during operation and minimize the complexities of operating conventional high channel-count systems while still providing both sensing and stimulation capabilities.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses a neuromonitoring system comprising: at least one multi-channel recording device comprising a programmable switch matrix and a plurality of input channels; a plurality of electrodes connected to the at least one multi-channel recording device via the plurality of input channels; at least one stimulator module connected to the at least one multi-channel recording device; at least one computing device in communication with the at least one multi-channel recording device; and at least one display unit in data communication with the at least one computing device; wherein the programmable switch matrix is configured, in response to commands from the at least one computing device, to enable any electrode or combination of electrodes of the plurality of electrodes corresponding to any single input channel or combination of input channels to function as a common reference.

Optionally, the neuromonitoring system further comprises at least one database in data communication with the at least one computing device.

Optionally, the at least one computing device is configured to command the programmable switch to enable any electrode or combination of electrodes of the plurality of electrodes to function as a common ground electrode.

Optionally, the at least one computing device is configured to automatically command, without manual intervention by a user, the programmable switch to enable any electrode or combination of electrodes of the plurality of electrodes to function as a common ground electrode when a previously designated common ground electrode is damaged or disconnected.

Optionally, the neuromonitoring system comprises two or more multi-channel recording devices. Optionally, the programmable switch matrix is configured, in response to commands from the at least one computing device, to enable any electrode or combination of electrodes of the plurality of electrodes to function as a global common reference for each of the two or more multi-channel recording devices.

Optionally, the at least one computing device further comprises a sensing module, and a switching module. Optionally, the switching module is adapted to configure the programmable switch matrix such that the system functions in at least one of a sensing mode or in a stimulation mode. Optionally, when in the stimulation mode, the neuromonitoring system is configured to provide multi-contact cortical stimulation by allowing any combination of electrodes of the plurality of electrodes to be configured as anodes or cathodes, without requiring a user to move electrode locations on a patient manually, and stimulating more than two electrodes of the plurality of electrodes simultaneously.

Optionally, the neuromonitoring system further comprises a power module in communication with the at least one multi-channel recording device and the at least one computing device.

Optionally, the at least one display unit is configured to provide a user a graphical user interface comprising a plurality of inputs, wherein each of the plurality of inputs is adapted to receive a user input that selects a function of each electrode of the plurality of electrodes.

Optionally, the switch matrix is configured to measure ground impedance without switching a reference electrode into the ground circuit.

The present specification also discloses a programmable switch matrix adapted for use with a recording device in a neuromonitoring system, comprising: an electrode connection link, wherein the electrode connection link is in data communication with a plurality of electrodes; a programmable ground switch matrix in communication with the electrode connection link; a programmable reference switch matrix in communication with the programmable ground switch matrix and comprising a first output in communication with input channels of the recording device and a second output; a ground circuit connected to the programmable ground switch matrix; and two or more switches in data communication with the second output of the programmable reference switch matrix and with the input channels of the recording device, wherein the two or more switches comprise at least a programmable stimulation anode switch matrix and a programmable stimulation cathode switch matrix and wherein, in response to commands from a microcontroller, the programmable switch matrix is configured to enable any electrode or combination of electrodes of the plurality of electrodes to function as a common reference.

Optionally, the programmable switch matrix further comprises a buffer in line between the communication of the two or more switches with the programmable reference switch matrix.

Optionally, the programmable switch matrix further comprises at least one set of input/output ports configured to enable connection with at least one recording device. Optionally, the programmable switch matrix further comprises a programmable stimulation anode switch matrix in communication with the patient connection link and the at least one set of input/output ports. Optionally, the programmable switch matrix further comprises a programmable stimulation cathode switch matrix in communication with the patient connection link and the at least one set of input/output ports.

Optionally, in response to commands from the microcontroller, the programmable switch matrix is configured to enable any electrode or combination of electrodes of the plurality of electrodes to function as a common ground electrode.

Optionally, in response to commands from the microcontroller, the programmable switch matrix is automatically configured, without requiring manual intervention by a user, to enable any electrode or combination of electrodes of the plurality of electrodes to function as a common ground electrode if a previously designated ground electrode is damaged or disconnected.

Optionally, in response to commands from the microcontroller, the programmable switch matrix is configured to enable any electrode or combination of electrodes of the plurality of electrodes to function as a global common reference for all recording devices in data communication with the programmable switch matrix.

Optionally, the programmable switch matrix is further configured to function in at least one of a sensing mode or in a stimulation mode.

Optionally, when in a stimulation mode, the programmable switch matrix is configured to provide multi-contact cortical stimulation by allowing any combination of electrodes of the plurality of electrodes to be configured as anodes or cathodes. Optionally, when in a stimulation mode, the programmable switch matrix is configured to provide multi-contact cortical stimulation by allowing any combination of electrodes of the plurality of electrodes to be stimulated simultaneously.

Optionally, the programmable switch matrix further comprises a set of ports adapted to provide power from a power module in communication with the recording device.

Optionally, a display unit of the neuromonitoring system is configured to provide a user a graphical user interface comprising a plurality of inputs adapted to receive a selection of a function for each electrode of the plurality of electrodes.

The present specification also discloses a neuromonitoring system comprising: at least one multi-channel recording device comprising an integrated programmable switch matrix and a plurality of input channels; a plurality of electrodes connected to the at least one multi-channel recording device via the plurality of input channels; at least one stimulator module connected to the at least one multi-channel recording device; at least one computing device in communication with the at least one multi-channel recording device; at least one display unit in data communication with the at least one computing device; and at least one database in data communication with the at least one computing device; wherein the integrated programmable switch matrix is configured, in response to commands from the at least one computing device, to enable any electrode or combination of electrodes of the plurality of electrodes corresponding to any single input channel or combination of input channels to function as a common reference.

Optionally, the at least one computing device is configured to command the integrated programmable switch to enable any electrode or combination of electrodes of the plurality of electrodes corresponding to any single input channel or combination of input channels to function as a common ground electrode. Optionally, the at least one computing device is configured to command the integrated programmable switch to enable any electrode or combination of electrodes of the plurality of electrodes corresponding to any single input channel or combination of input channels to function as a common ground electrode in the event of ground electrode damage or disconnection without a user needing to manually connect a new electrode.

The neuromonitoring system may comprise two or more multi-channel recording devices. Optionally, the integrated programmable switch matrix is configured, in response to commands from the at least one computing device, to enable any electrode or combination of electrodes of the plurality of electrodes corresponding to any single input channel or combination of input channels to function as a global common reference for all of the two or more multi-channel recording devices.

Optionally, the at least one computing device further comprises a sensing module, a stimulation module, and a switching module. Optionally, the switching module is configured to implement a plurality of instructions or programmatic code to program or configure the integrated programmable switch matrix such that the system functions in a sensing operation mode and/or in a stimulation operation mode. Optionally, when in a stimulation operation mode, the system is configured to provide multi-contact cortical stimulation by allowing any combination of electrodes of the plurality of electrodes to be configured as anodes and cathodes and stimulating more than two electrodes of the plurality of electrodes simultaneously.

Optionally, the neuromonitoring system further comprises a power module in communication with the at least one multi-channel recording device and the at least one computing device.

Optionally, the at least one display unit is configured to provide a user a graphical user interface comprising a plurality of dialog boxes for selecting a function of each electrode of the plurality of electrodes.

Optionally, the neuromonitoring system is configured to measure ground impedance without switching a reference electrode into the ground circuit.

The present specification also discloses a programmable switch matrix for use with a recording device in a neuromonitoring system, comprising: a patient connection link from a plurality of electrodes; a programmable ground switch matrix in communication with the connection link; a programmable reference switch matrix in communication with the programmable ground switch matrix and comprising a first output in communication with input channels of the recording device and a second output; a ground circuit connected to the programmable ground switch matrix; a plurality of switches in communication with the second output of the programmable reference switch matrix and with the input channels of the recording device; a buffer in line between the communication of the plurality of switches with the programmable reference switch matrix; at least one set of input/output ports configured to enable connection with at least one other recording device; a programmable stimulation anode switch matrix in communication with the patient connection link and the at least one set of input/output ports; and a programmable stimulation cathode switch matrix in communication with the patient connection link and the at least one set of input/output ports; wherein the programmable switch matrix is configured, in response to commands from a microcontroller, to enable any electrode or combination of electrodes of the plurality of electrodes corresponding to any single input channel or combination of input channels to function as a common reference.

Optionally, the programmable switch matrix is configured to enable any electrode or combination of electrodes of the plurality of electrodes corresponding to any single input channel or combination of input channels to function as a common ground electrode.

Optionally, the programmable switch matrix is configured to enable any electrode or combination of electrodes of the plurality of electrodes corresponding to any single input channel or combination of input channels to function as a common ground electrode in the event of ground electrode damage or disconnection without a user needing to manually connect a new electrode.

Optionally, the programmable switch matrix is configured to enable any electrode or combination of electrodes of the plurality of electrodes corresponding to any single input channel or combination of input channels to function as a global common reference for all recording devices of the neuromonitoring system.

Optionally, the programmable switch matrix is configured to receive a plurality of instructions or programmatic code from the microcontroller such that the neuromonitoring system functions in a sensing operation mode and/or in a stimulation operation mode. Optionally, when in a stimulation operation mode, the system is configured to provide multi-contact cortical stimulation by allowing any combination of electrodes of the plurality of electrodes to be configured as anodes and cathodes and stimulating more than two electrodes of the plurality of electrodes simultaneously.

Optionally, the programmable switch matrix further comprises a second set of input/output ports for providing power from a power module in communication with the recording device.

Optionally, a display unit of the neuromonitoring system is configured to provide a user a graphical user interface comprising a plurality of dialog boxes for selecting a function of each electrode of the plurality of electrodes.

Optionally, the neuromonitoring system is configured to measure impedance without switching a reference electrode into the ground circuit.

The aforementioned and other embodiments of the present shall be described in greater depth in the drawings and detailed description provided below.

BRIEF DESCRIPTION OF THE DRAWINGS

These and other features and advantages of the present specification will be further appreciated, as they become better understood by reference to the following detailed description when considered in connection with the accompanying drawings.

DETAILED DESCRIPTION

Figure 1A:
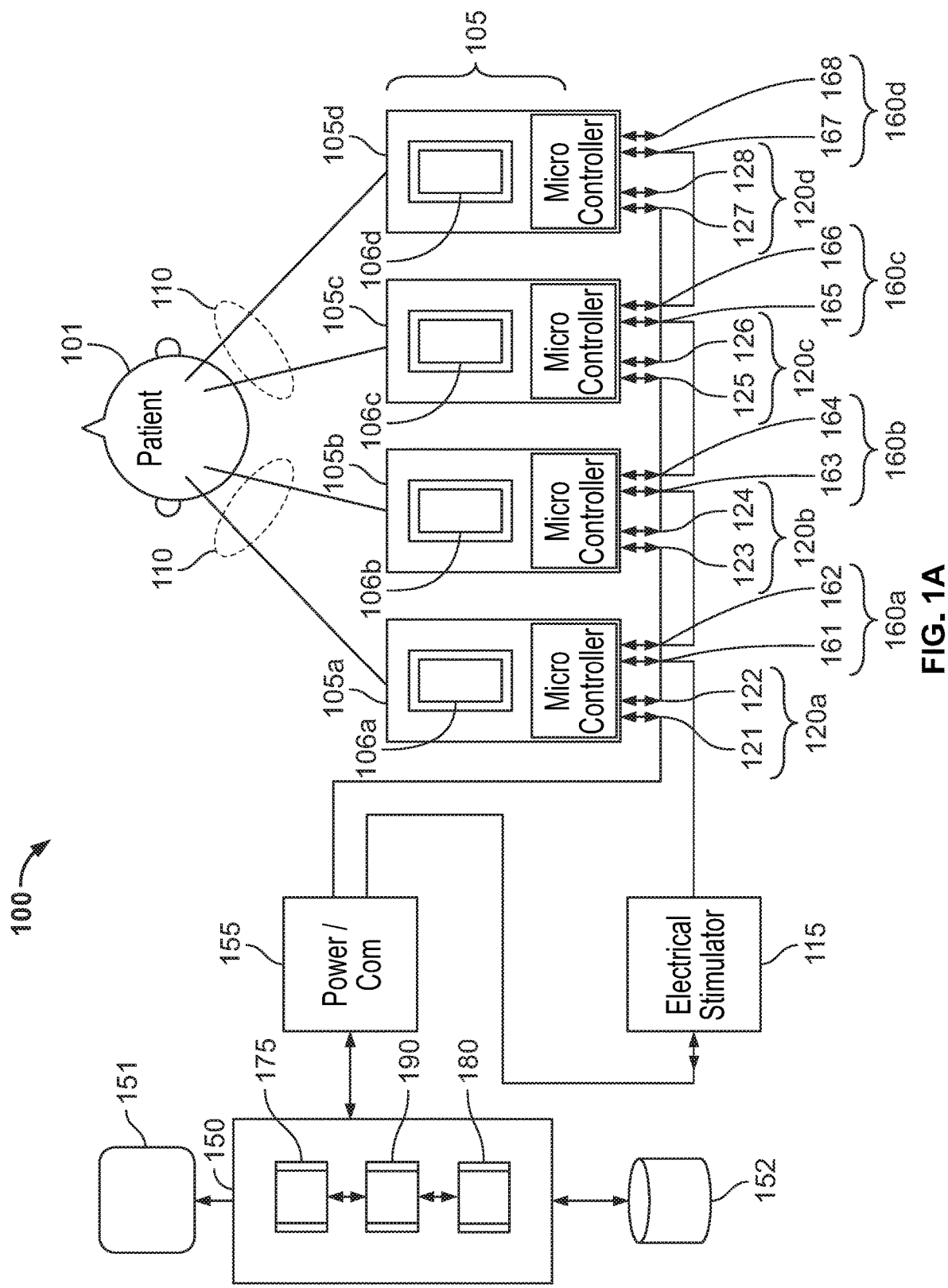
FIG. 1A is a block diagram showing a system for the sensing, monitoring and recording of bioelectrical/neurophysiological signals and the mapping of a patient's brain through cortical stimulation, in accordance with some embodiments of the present specification.

The present specification discloses a programmable switch matrix for a medical device system used for long-term monitoring of electroencephalogram (EEG) signals and mapping of the brain through cortical stimulation. Various embodiments disclose a programmable switch matrix integrated in an EEG recording device for connecting any patient electrode(s) to a ground circuit, connecting any patient electrode to a common reference, connecting a selected common reference to any or all recording device(s) in the system and, connecting any patient electrode(s) to anode and/or cathode outputs of a neurostimulator.

In accordance with some aspects of the present specification, the switch matrix is programmable through at least one GUI and programmatic code or instructions from a plurality of modules executed on a computing device.

A "computing device" is at least one of a cellular phone, PDA, smart phone, tablet computing device, patient monitor, custom kiosk, or other computing device capable of executing programmatic instructions. It should further be appreciated that each device and monitoring system may have wireless and wired receivers and transmitters capable of receiving and transmitting data. Each "computing device" may be coupled to at least one display, which displays information about the patient parameters and the functioning of the system, by means of a GUI. The GUI also presents various menus that allow users to configure settings according to their requirements. The system further comprises at least one processor (not shown) to control the operation of the entire system and its components. It should further be appreciated that the at least one processor is capable of processing programmatic instructions, has a memory capable of storing programmatic instructions, and employs software comprised of a plurality of programmatic instructions for performing the processes described herein. In one embodiment, the at least one processor is a computing device capable of receiving, executing, and transmitting a plurality of programmatic instructions stored on a volatile or non-volatile computer readable medium. In addition, the software comprised of a plurality of programmatic instructions for performing the processes described herein may be implemented by a computer processor capable of processing programmatic instructions and a memory capable of storing programmatic instructions.

The term 'user' is used interchangeably to refer to a surgeon, neuro-physician, neuro-surgeon, neuro-physiologist, technician and/or other patient-care personnel or staff.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically.

A "switch matrix module" refers to one or more electromechanical switches, multiple electromechanical switches in a single package (for example, an array of switches), or switches integrated onto an ASIC platform. In various embodiments, a "switch" may be a double-pole, single-throw switch, two single-pole, single-throw switches, or any other switching device such as, for example, field effect transistors (FETs) and bipolar junction transistors (BJTs).

"Electrode" refers to a conductor used to establish electrical contact with a nonmetallic part of a circuit. For example, EEG electrodes are small metal discs or contacts usually made of stainless steel, platinum, tin, gold or silver covered with a silver chloride coating. They are placed on the scalp or intracranially, on the surface of or within the brain in special positions.

A "subdural electrode grid" refers to a thin sheet of material with multiple small (mm in size) recording electrodes implanted within it. These are placed directly on the surface of the brain and have the advantage of recording the EEG without the interference of the skin, fat tissue, muscle, and bone that may limit scalp EEG. Shapes and sizes of these sheets are chosen to best conform to the surface of the brain and the area of interest.

A "depth electrode" refers to probes that are implanted within the brain itself. Each probe has multiple electrode contacts which surround it. These electrodes are able to record brain activity along the entire length of the implanted probe. They have the advantage of recording activity from structures deeper in the brain. They can be implanted through small skin pokes.

"Montage" refers to the placement of the electrodes. The EEG can be monitored with either a bipolar montage or a referential one. Bipolar means that there are two electrodes per one channel, so there is a reference electrode for each channel in a recording device. The referential montage means that there is a common reference electrode for all the channels in a recording device.

The term "common reference" refers to an electrode selected such that other electrode inputs are measured in relation to it. The common reference is used to cancel unwanted electrical noise that occurs on the body and is typically placed on the body in an area with little neural activity.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise.

FIG. 1A is a block diagram illustration of a system 100 for the sensing, monitoring and recording of bioelectrical/neurophysiological signals and the mapping of a patient's brain through cortical stimulation, in accordance with some embodiments of the present specification. The system 100 is a high channel-count system comprising one or more multi-channel recording devices 105 such as, for example, recording devices 105a, 105b, 105c, 105d that share a communication link with a computing device 150 and are configured to sense, record and monitor bioelectrical signals from the patient 101 via one or more of a plurality of electrodes 110, at least one neurostimulator module 115 that is connected to the recording devices 105a, 105b, 105c, 105d to generate and apply stimulation to the patient 101 via one or more of the plurality of electrodes 110, and the computing device 150 that is also in communication with the recording devices 105a, 105b, 105c, 105d and neurostimulator module 115 through a power module 155. The computing device 150 is in data communication with a display unit 151 and at least one database 152. Each of the recording devices 105a, 105b, 105c, 105d includes a plurality of recording or input channels that individually connect to lead wires of the plurality of electrodes 110.

The computing device 150 includes an input/output controller, at least one communications interface and system memory. The system memory includes at least one random access memory (RAM) and at least one read-only memory (ROM). These elements are in communication with a central processing unit (CPU) to enable operation of the computing device 150. In various embodiments, the computing device 150 may be a conventional standalone computer or alternatively, the functions of the computing device 150 may be distributed across multiple computer systems and architectures. For example, in a distributed architecture the at least one database 152 and processing circuitry are housed in separate units or locations. Some units perform primary processing functions and contain at a minimum a general controller or a processing circuitry and a system memory.

In some embodiments, execution of a plurality of sequences of programmatic instructions or code enable or cause the CPU of the computing device 150 to perform various functions and processes. In alternate embodiments, hard-wired circuitry may be used in place of, or in combination with, software instructions for implementation of the processes of systems and methods described in this application. Thus, the systems and methods described are not limited to any specific combination of hardware and software.

In various embodiments, the plurality of electrodes 110 are small metal contacts typically made of stainless steel, platinum, tin, gold or silver covered with a silver chloride coating. In some embodiments, the electrodes 110 are placed on the scalp of patient 101. In some embodiments, at least a subset of the plurality of electrodes 110 are placed as scalp and/or intracranial electrodes as a combination of one or more depth electrodes, grid electrodes, and/or strip electrodes. In some embodiments, at least a subset of the plurality of electrodes 110 may also be placed in muscle sites at other parts of the patient's body to record/sense MEP (Motor Evoked Potential) activity such as in context of a CSM (Cortical Stimulation Mapping) procedure.

In some embodiments, the electrodes 110 record bioelectrical signals, such as EEG signals, from the patient's brain. In some embodiments the electrodes 110 record neurophysiological signals, such as MEP, from other parts of the patient's body. In some embodiments, the electrodes 110 record signals both from the patient's brain and from other parts of the patient's body.

In embodiments, each recording device 105a, 105b, 105c, 105d respectively includes a first pair of input/output (I/O) ports 120a, 120b, 120c, 120d and a second pair of input/output (I/O) ports 160a, 160b, 160c, 160d that enable the recording devices 105a, 105b, 105c, 105d to be in communication with the computing device 150. As shown in FIG. 1A, in some embodiments, the first and second pairs of input/output (I/O) ports 120a, 120b, 120c, 120d and 160a, 160b, 160c, 160d provide for physical connection of the recording devices 105a, 105b, 105c, 105d with one another and for communication between each individual recording device 105a, 105b, 105c, 105d the computing device 150 and the neurostimulator module 115.

In an embodiment, a first port 121 of the I/O ports 120a enables connection of the recording device 105a with the computing device 150 through the power module 155. A second port 122 of the I/O ports 120a connects with a first port 123 of the I/O ports 120b of the recording device 105b enabling the connection of recording device 105b with the computing device 150 while a second port 124 of the I/O ports 120b connects with a first port 125 of the I/O ports 120c of the recording device 105c enabling the connection of recording device 105c with the computing device 150. Similarly, the second port 126 of the I/O ports 120c connects with a first port 127 of the I/O ports 120d of the recording device 105d enabling the connection of recording device 105d with the computing device 150. Since the present exemplary embodiment illustrates a chain of four interconnected recording devices 105a, 105b, 105c, 105d, the second port 128 of the I/O ports 120d remains unused. In some embodiments, the recording device 105d may not have the second port 128. In other words, in some embodiments, the last recording device, in a chain of interconnected recording devices, may just have a single I/O port 127.

Input/output (I/O) ports 160a, 160b, 160c, 160d provide for connection of stimulator anode and cathode from the neurostimulator module 115 and ground potential and global common reference between the recording devices 105a, 105b, 105c, 105d. A first port 161 of the I/O ports 160a enables connection of the recording device 105a with the neurostimulator module 115. A second port 162 of the I/O ports 160a connects common signals with a first port 163 of the I/O ports 160b of the recording device 105b while a second port 164 of the I/O ports 160b connects common signals with a first port 165 of the I/O ports 160c of the recording device 105c. Similarly, the second port 166 of the I/O ports 160c connects common signals with a first port 167 of the I/O ports 160d of the recording device 105d. Since the present exemplary embodiment illustrates a chain of four interconnected recording devices 105a, 105b, 105c, 105d, the second port 168 of the I/O ports 160d remains unused. In some embodiments, the recording device 105d may not have the second port 168. In other words, in some embodiments, the last recording device, in a chain of interconnected recording devices, may just have a single I/O port 167.

Thus, in broad terms, the first pair of I/O ports 120a, 120b, 120c, 120d enables the recording devices 105a, 105b, 105c, 105d to be in communication with the computing device 150, through the power module 155, while the second pair of I/O ports 160a, 160b, 160c, 160d enables the recording devices 105a, 105b, 105c, 105d and the neurostimulator module 115 to be connected to common signals used across the devices 105. The neurostimulator module 115 is also in communication with the computing device 150 through the power module 155.

In accordance with an aspect of the present specification, each recording device 105a, 105b, 105c, 105d respectively includes integrated, thereto, programmable switch matrix modules 106a, 106b, 106c, 106d. The switch matrix modules 106a, 106b, 106c, 106d are connected to the plurality of electrodes 110, the plurality of recording/input channels of the recording devices 105a, 105b, 105c, 105d and are in communication with the computing device 150 and the neurostimulator module 115 via the first and second pairs of I/O ports 120a, 120b, 120c, 120d and 160a, 160b, 160c, 160d. Thus, under the control of the computing device 150, the switch matrix modules 106a, 106b, 106c, 106d connect the plurality of electrodes 110 to the input channels of the recording devices 105a, 105b, 105c, 105d and/or to the neurostimulator module 115.

The computing device 150 can send commands or instructions to the recording devices 105a, 105b, 105c, 105d, programmable switch matrix modules 106a, 106b, 106c, 106d and the neurostimulator module 115. Additionally, the computing device 150 can receive data from the recording devices 105a, 105b, 105c, 105d and, where needed, from the neurostimulator module 115.

In various embodiments, the switch matrix modules 106a, 106b, 106c, 106d, in response to commands received from the computing device 150, are operable to change a circuit path configuration of the recording devices 105a, 105b, 105c, 105d based on a mode of operation of the system 100. The switch matrix modules 106a, 106b, 106c, 106d may open certain switches and/or close certain switches to enable the system 100 to switch from one operational mode to another operational mode or function in two operational modes simultaneously.

In accordance with aspects of the present specification, the computing device 150 executes a sensing software engine or module 175 (hereinafter referred to as a 'sensing module'), a stimulation software engine or module 180 (hereinafter referred to as a 'stimulation module') and a switching software engine or module 190 (hereinafter referred to as a 'switching module'). In embodiments, the modules 175, 180 and 190 are in data communication with each other.

The switching software engine 190 is configured to streamline electrode layout with automated input mapping. The switching module 190 implements a plurality of instructions or programmatic code to program or configure the switch matrix modules 106a, 106b, 106c, 106d such that the system 100 functions in a sensing operation mode and/or in a stimulation operation mode. In the sensing mode, the switch matrix modules 106a, 106b, 106c, 106d are programmed to selectively connect at least a subset of the plurality of electrodes 110 to the recording/input channels of one or more of the recording devices 105a, 105b, 105c, 105d. Thus, in the sensing mode, at least a subset of the plurality of electrodes 110 is configured to sense, record and acquire EEG data from the patient's brain or cortex and/or to sense, record and acquire MEP (Motor Evoked Potential) signals from various muscle sites on other parts of the patient's body.

In the stimulation mode, the switch matrix modules 106a, 106b, 106c, 106d are programmed to selectively connect at least a subset of the plurality of electrodes 110 to the neurostimulator module 115. Thus, in the stimulation mode, at least a subset of the plurality of electrodes 110 is configured to receive programmed stimulation from the neurostimulator module 115 and apply the stimulation to the patient's brain or cortex. In some embodiments, the stimulation may be probing in nature such as, for example, those utilized for brain mapping.

It should be appreciated that in various embodiments, the switch matrix modules 106a, 106b, 106c, 106d are programmed to enable at least a subset of the plurality of electrodes 110 to sense and record EEG data and/or deliver stimulation received from the neurostimulator module 115. That is, it is not necessary that all recording devices 105a, 105b, 105c, 105d and all of the plurality of electrodes 110 be simultaneously configured to function in the sensing mode, stimulation mode or both (that is, in some embodiments, one or more of the plurality of electrodes 110 may neither sense EEG data nor deliver stimulation and may be configured to be non-functional).

In accordance with some embodiments, the sensing module 175 implements a plurality of instructions or programmatic code to generate at least one GUI (Graphical User Interface) to display, to the user, visual representation of the placement of the plurality of electrodes 110 on the patient's brain or cortex and/or on other parts of the patient's body. In some embodiments, the module 175 generates at least one GUI to display one or more two and/or three-dimensional topographical maps or views of the patient's brain such that the plurality of electrodes 110 (along with their associated input channels across the recording devices 105a, 105b, 105c, 105d) and their relative positioning on the scalp or on/in the brain are correspondingly identified and marked or displayed on the maps.

It should be appreciated that while, in some embodiments, the at least one GUI is generated by the sensing module 175 in alternate embodiments these may be generated by any of the other modules that is, the stimulation module 180 or the switching module 190. In still alternate embodiments, the at least one GUI may be generated by a standalone dedicated software module (executed on the computing device 150) in data communication with the sensing, stimulation and switching modules 175, 180, 190.

The at least one GUI enables the user to make a plurality of interactive selections or choices such as, but not limited to, selecting or choosing: which electrode(s) should sense and acquire EEG data, which electrode(s) should sense and acquire MEP data, which one or a combination of electrodes (associated with any one of the recording devices 105a, 105b, 105c, 105d) should function as patient ground electrode(s), which one or a combination of electrodes (associated with any one of the recording devices 105a, 105b, 105c, 105d) should function as a common reference electrode and if a common reference electrode should also be shared as a global common reference electrode to any one, two, three or all of the recording devices 105a, 105b, 105c, 105d, and which electrodes (from the plurality of electrodes 110) should function as anodes and cathodes of the neurostimulator module 115 for cortical stimulation. Therefore, in various embodiments, any recording device 105 can be configured for common reference as: local, where it uses a channel belonging to it as common reference; global master, where it uses a channel belonging to it for its own common reference and for other recording device(s) as a common reference; and, global slave, were it uses a channel from another recording device for its common reference. Therefore, in some embodiments, multiple electrodes could be selected as common references.

The at least one GUI also enables the user to indicate selection of one or more electrode combinations or montages. Montages (or combinations of electrodes) provide a picture of the spatial distribution of the EEG across the patient's cortex. Accordingly, montage is an electrical map obtained from a spatial array of recording electrodes and refers to a particular combination of electrodes examined at a particular point in time.

In some embodiments, the at least one GUI displays a montage selection toolbar that allows the user to pick a selection drawing loop from a plurality of exemplary drawing loop shapes. The user can draw loops around the visual representation of the placement of the plurality of electrodes 110 on the patient's brain or cortex. In some embodiments, the user may simply click on electrode representations on the GUI to select or create montages. In some embodiments, the user may select and generate bipolar montages by selecting one or more pairs of adjacently placed electrodes since bipolar montages are based on the principle of comparing a single EEG electrode tracing to its adjacent neighboring electrode. In some embodiments, a plurality of referential montages may be indicated by the user via selection of singular electrodes using the drawing loop. For referential montages, signals at each of the plurality of electrodes are compared to a common reference electrode (associated with any one of the recording devices 105a, 105b, 105c, 105d) that, in some embodiments, may also function as a global common reference electrode to any one, two, three or all of all recording devices 105a, 105b, 105c, 105d.

The aforementioned plurality of user selections or choices are stored in the memory of the computing device 150 and/or in the at least one database 152. These user selections or choices are accessed by the sensing, stimulation and switching modules 175, 180, 190.

Figure 3:
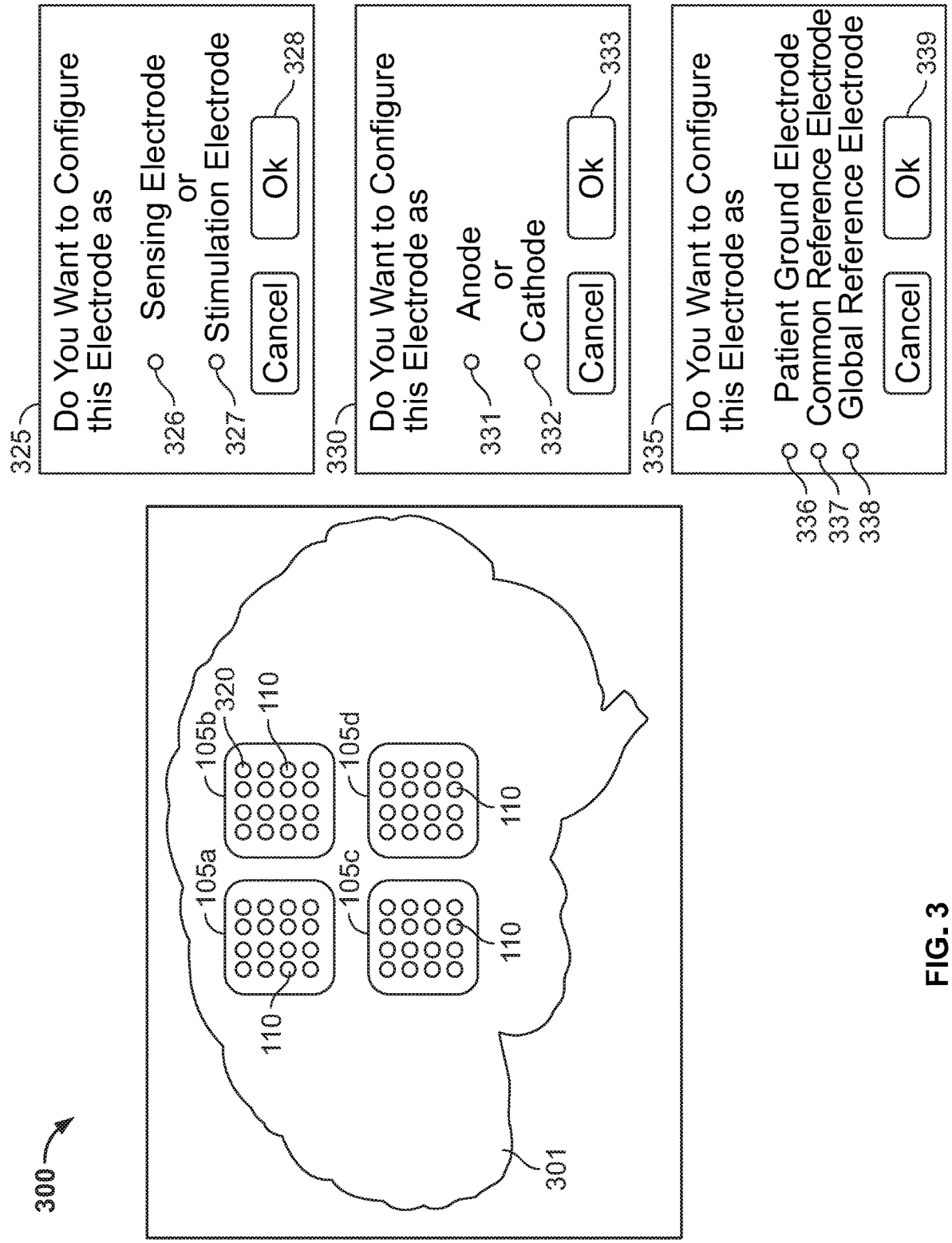
FIG. 3 illustrates an exemplary graphical user interface (GUI) and dialog boxes for enabling a user to make a plurality of interactive selections with respect to electrodes across multiple recording devices of the system of FIG. 1A, in accordance with some embodiments of the present specification.

FIG. 3 illustrates an exemplary GUI 300 and dialog boxes 325, 330, 335 for enabling a user to make a plurality of interactive selections or choices with respect to the plurality of electrodes 110 across multiple recording devices 105a, 105b, 105c and 105d, in accordance with some embodiments of the present specification. In embodiments, each of the plurality of electrodes 110 is graphically represented on a topographical map 301 of a patient's brain. In embodiments, each of the plurality of electrodes 110 is uniquely identified within the associated recording device 105a, 105b, 105c and 105d on the map 301.

In some embodiments, the user may click on a graphical representation of an electrode 320 within the recording device 105b. As a result of the user's clicking, a first dialog box 325 appears displaying a first option 326 of configuring the electrode 320 as a sensing electrode and a second option 327 of configuring the electrode 320 as a stimulation electrode. On selecting the second option 327, the user choice for the electrode 320 to be a stimulation electrode is acquired and stored. On clicking the ok button 328, the user is presented with a second dialog box 330 asking if the electrode 320 should be connected to the anode 331 or cathode 332 of the neurostimulator module 115. On clicking the "ok" button 333, the user selection for the electrode 320 as cathode or anode is stored.

On selecting the first option 326 in dialog box 325, the user choice for the electrode 320 to be a sensing electrode is acquired and stored. On clicking the ok button 328 the user is presented with a third dialog box 335 asking the user to choose from the following options: a) if the electrode 320 should function as a patient ground electrode 336, b) if the electrode 320 should function as a common reference electrode 337 for the current recording device 105b, and c) if the electrode 320 should function as a global reference electrode 338 for all recording devices 105a, 105b, 105c and 105d. On clicking the ok button 339, the user's selection is stored.

In an embodiment, presentation of various options of the dialog box 335 is under an assumption that the user has pre-selected or pre-chosen to generate unipolar or referential montages across the recording devices 105a, 105b, 105c and 105d. Thus, in an alternate embodiment, if the user has pre-selected or pre-chosen to generate bipolar montages across the recording devices 105a, 105b, 105c and 105d the dialog box 335 may not display options 337 and 338.

Referring back to FIG. 1A, the switching module 190, in various embodiments, accesses the plurality of stored user selections or choices and accordingly implements a plurality of instructions such that the switch matrix modules 106a, 106b, 106c, 106d are programmed or configured to prepare the system 100 to function in the sensing and/or stimulation modes. For example, in some embodiments, if the plurality of stored user selections or choices require the system 100 to function in both sensing and stimulation modes, the switch matrix modules 106a, 106b, 106c, 106d are programmed or configured (according to a plurality of instructions from the switching module 190) to facilitate the following aspects or features related to both EEG data sensing/recording and stimulation: enable at least a subset of the plurality of electrodes 110 to be connected to the input channels of one or more of the recording devices 105a, 105b, 105c, 105d so as to sense and record EEG signals (and/or MEP signals) from the patient's brain or cortex (in the sensing mode); enable any single input channel of a recording device, such as (for example) the recording device 105a, to function as a common reference (in the sensing mode); enable any single input channel of a recording device, such as (for example) of the recording device 105a, to function as a global common reference to any one, two or all three of the remaining recording devices 105b, 105c, 105d (in the sensing mode); enable any single input channel or combination of input channels of each of the recording devices 105a, 105b, 105c, 105d to be used as patient ground electrode (in the sensing mode) as all recording devices are connected to the ground potential through a link provided by input/output (I/O) ports 160a, 160b, 160c, 160d such that one recording device can be used as the patient ground connection and all other recording devices will be connected to that potential through the link; enable impedance measurement of patient ground electrode with reduced number of switches via simplified switching (in the sensing mode); enable electrodes used for ground and/or common reference to be additionally used as sensing electrodes to, for example, record EEG signals, and enable any one or combination(s) of the plurality of electrodes 110 to function as anodes and/or cathodes for multi-contact cortical stimulation—that is, enable any one or combination(s) of the plurality of electrodes 110 (across one or more of the recording devices 105a, 105b, 105c, 105d) to be connected to anode and/or cathode outputs of the neurostimulator module 115 (in the stimulation mode).

It should be appreciated, that in an alternate embodiment, if the plurality of stored user selections or choices require the system 100 to function only in the sensing mode then the switch matrix modules 106a, 106b, 106c, 106d are programmed or configured (according to a plurality of instructions from the switching module 190) to facilitate only those of the aforementioned aspects or features that are related to EEG/MEP data sensing/recording. In another alternate embodiment, if the plurality of stored user selections or choices require the system 100 to function only in the stimulation mode then the switch matrix modules 106a, 106b, 106c, 106d are programmed or configured (according to a plurality of instructions from the switching module 190) to facilitate only those of the aforementioned aspects or features that are related to stimulation.

In the sensing mode, EEG and/or MEP signals, acquired by the so configured electrodes, are amplified and converted from analog to digital data by the recording devices 105a, 105b, 105c, and 105d. The digitized EEG/MEP data is transmitted to the sensing module 175 that implements a plurality of instructions or programmatic code to process, store, retrieve and display, on the display unit 151, the patient's EEG/MEP waveform data. In embodiments, the sensing module 175 processes the sensed or received signals, extracts parameters that characterize the EEG/MEP data, and generates a display of the data for the user. The processed EEG/MEP data is either displayed on the display unit 151 in real-time or stored in the at least one database 152 for later analyses.

Figure 1C:
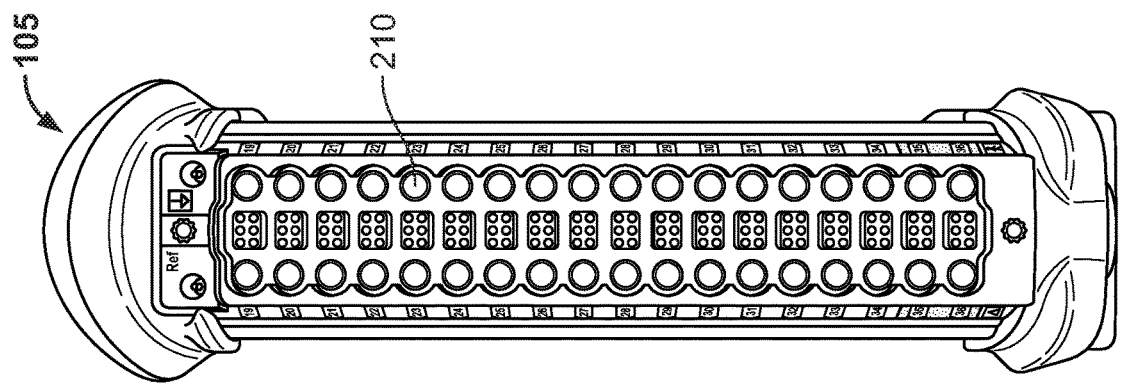
FIG. 1C shows a side view of the multi-channel amplifier of FIG. 1B.
Figure 1B:
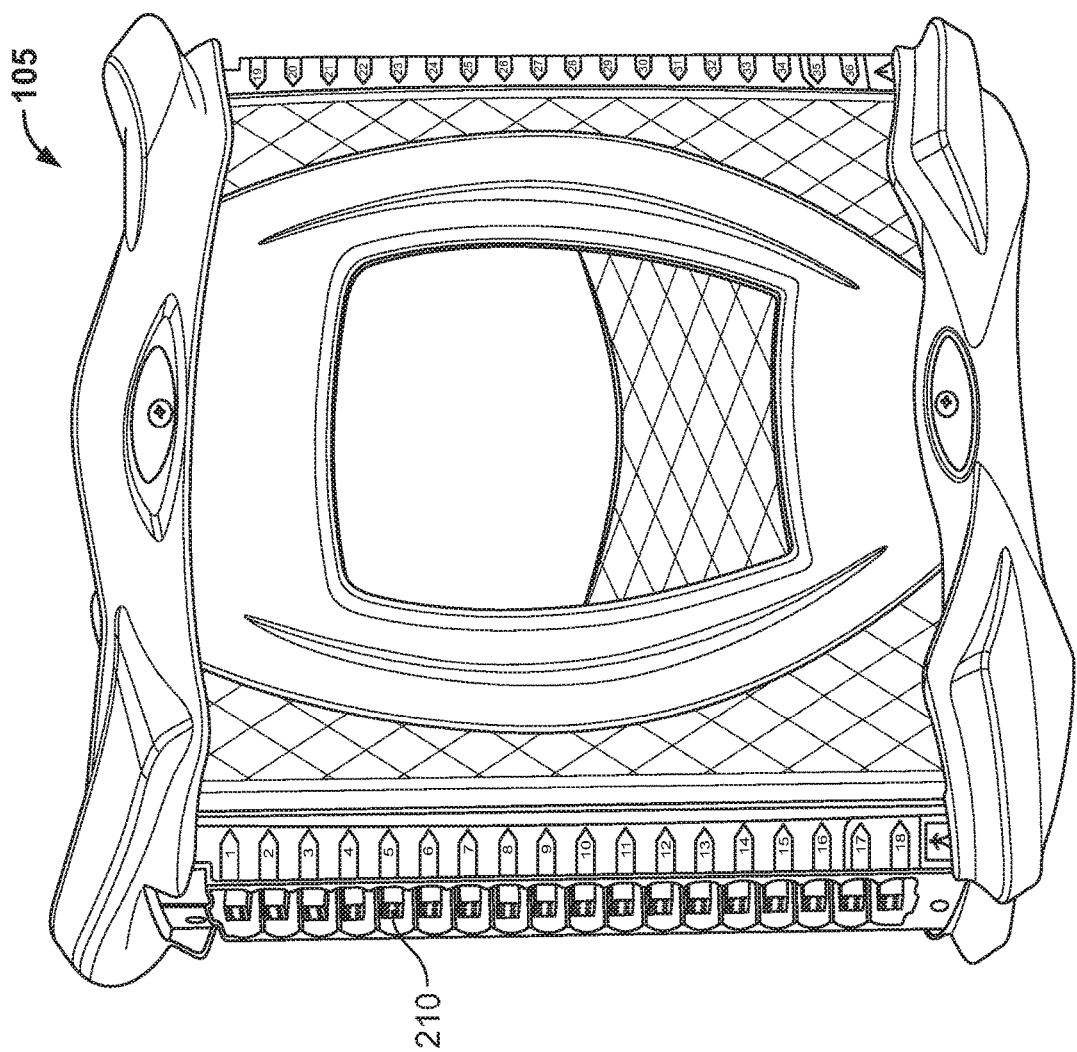
FIG. 1B shows a perspective view of an exemplary multi-channel amplifier for use with the systems of the present specification.

FIGS. 1B and 1C show perspective and side views, respectively, of an exemplary multi-channel amplifier 105 for use with the systems of the present specification. The amplifier 105 has a plurality of electrode input channels or ports 210. In embodiments, the amplifier 105 is configured so that a user may select any input as ground on any input channel or port 210 and select any other input as the recording reference. Further, as discussed below, a user may create montages up to, and including, all electrodes using at least one associated GUI. The multi-channel amplifier 105 of FIGS. 1B and 1C may be used for electrodes positioned on a patient's scalp but is specialized for neuromonitoring of patients using a plurality of electrodes positioned intracranially. The electrodes may comprise grid or strip electrodes or depth electrodes and may be implanted via craniotomy or through small burr holes in the skull. The multi-channel amplifier 105 of FIGS. 1B and 1C may be used for ECoG and sEEG monitoring. In some embodiments, the multi-channel amplifier 105 of FIGS. 1B and 1C may be used for long term monitoring, for example, for epilepsy patients to monitor and map an epileptic brain to determine candidates for surgery.

Switch Matrix Module

Figure 2:
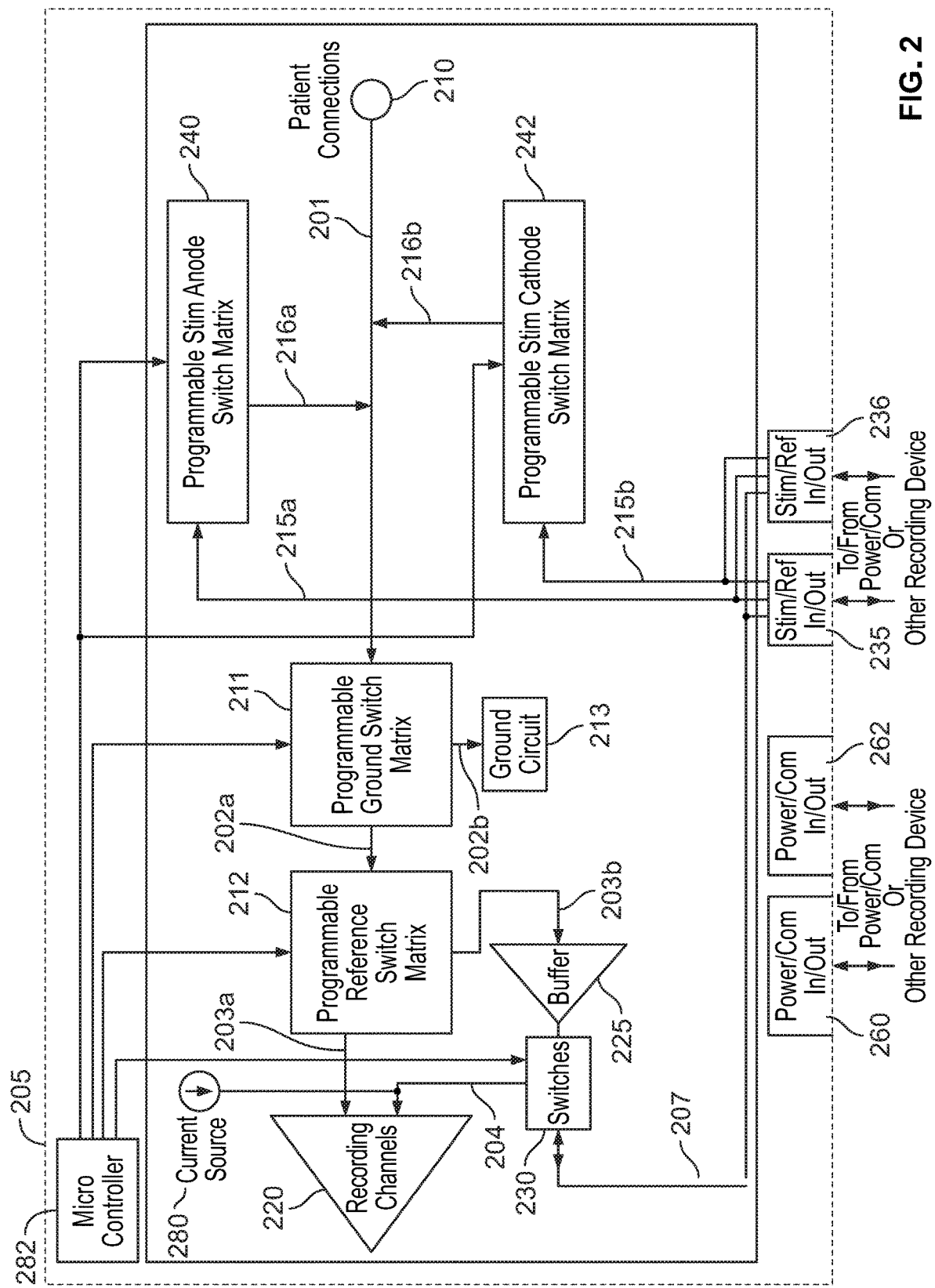
FIG. 2 is a block diagram illustrating a plurality of hardware components and connections of a programmable switch matrix module within a recording device, in accordance with some embodiments of the present specification.

FIG. 2 is a block diagram illustration of a plurality of hardware components and connections of a programmable switch matrix module 206 within a recording device 205, in accordance with some embodiments of the present specification. It should be appreciated that the switch matrix module 206 is representative of any of the switch matrix modules 106a, 106b, 106c and 106d while the recording device 205 is representative of any of the respective recording devices 105a, 105b, 105c and 105d of FIG. 1A.

Referring now to FIGS. 1A and 2, connection link 201 from the plurality of patient connections or electrodes 210 (corresponding to the recording device 205) is connected to a programmable ground switch matrix 211. A first output link 202a of the ground switch matrix 211 is connected to a programmable reference switch matrix 212 while a second output link 202b of the ground switch matrix 211 is connected to a ground circuit 213. A first output link 203a of the reference switch matrix 212 forms a first input to recording/input channels 220 of the recording device 205 while a second output link 203b of the reference switch matrix 212 is connected to an array of switches 230 through a voltage follower buffer or amplifier 225. An output link 204 from the switch array 230 forms a second input to the recording/input channels 220. A microcontroller 282 of the recording device 205 controls the plurality of switch matrices 211, 212, 240, 242 and switch array 230. The microcontroller 282 of the recording device 205 is in data communication with a computing device, such as computing device 150 of FIG. 1A.

In embodiments, under programmatic instructions from the switching module 190, the ground switch matrix 211 enables any one or a plurality of the patient connections or electrodes 210 to be connected to the ground circuit 213, thereby enabling any single or a combination of the patient connections or electrodes 210 to function as patient ground electrode(s).

A ground electrode is used for bioelectrical recordings, such as EEG, to improve signal quality by reducing interference from power lines and other equipment. Conventionally, for electrocorticography (ECoG) and stereotactic-EEG (sEEG) studies, a grid, strip or depth electrode is utilized for the patient ground connection because it is convenient for the user, allows the user to place the ground electrode close to the recording site to reduce noise and stimulus shock artifact and is a more reliable connection than a surface electrode during the course of the neurological study or therapy, which, in some embodiments, may extend beyond a week. When used as a ground connection, the grid or strip electrode is placed between the skull and scalp or brain and dura mater for ECoG studies. Alternatively, for sEEG studies, the user may use just a few contacts of a depth electrode, those contacts that are not fully implanted into the brain or those in the white or gray matter, as long as the electrodes in the gray matter are not in an area of interest, for the ground connection. In prior art, a single contact on the grid, strip or depth electrode is chosen for the ground connection and plugged into a single touch-proof jack, dedicated to patient ground, on the recording device.

In contrast, the programmable ground switch matrix 211 enables the grid, strip and/or depth electrode contacts used for the ground connection to advantageously be plugged into any input channel(s) on the recording device 205, allowing more than one contact to be used and not limiting the user to one dedicated touch-proof jack for a ground connection. Allowing a plurality of patient connections or electrodes for patient ground reduces the overall electrode impedance which improves signal-to-noise ratio. Also, if the connected ground electrode(s) breaks or gets disconnected, the programmable switch matrix module 206 enables any other connected electrode to be configured as the ground electrode via the switching module 190. In legacy recording devices, if the ground electrode breaks or becomes disconnected from the device, the user has to manually connect another electrode or reconnect the disconnected lead wire to the device which interferes with activity near the operating table during surgery, and can be cumbersome with tightly spaced jacks on high channel count systems.

As evident to persons of ordinary skill in the art, measurement of patient ground electrode impedance is essential to determine integrity of the electrode connection. A low impedance connection minimizes electrode artifacts and reduces radiated interference from outside sources. Conventionally, measurement of ground electrode impedance requires multiple switches to exchange the patient ground and reference electrode connections on the recording device and a separate current source for the ground electrode connection to generate the impedance signal.

In the system 100 of the present specification, a single constant current impedance source 280 generates a signal to measure electrode impedance. In accordance with some aspects of the present specification, the array of switches 230, programmed through a plurality of instructions or codes from the switching module 190, allows for a simplified measurement of patient ground electrode impedance by utilizing the single current source 280 for reference electrode impedance measurement to also generate an impedance signal for the ground impedance measurement (thus, there is no requirement for a separate impedance source or a switch matrix to exchange the reference and ground electrode connections in the hardware).

Thus, for ground electrode impedance measurement, the system 100 utilizes the existing circuitry for the reference electrode impedance measurement to generate the impedance signal plus one additional switch, included as a part of the switch array 230. The switch array 230 is configured to measure ground impedance without switching a reference electrode into the ground circuit. This eliminates the need for multiple switches to exchange the patient ground and reference connections and a digital-to-analog converter, amplifier and resistors to generate a separate impedance current source for the ground electrode measurement. The integrated switch array 230 and channel impedance source 280 allows for dynamically switching the patient ground electrode to a common reference and use of the channel impedance source 280 plus any other connected channel to measure patient ground electrode impedance. In accordance with embodiments of the present specification, the reference electrode does not need to be switched to the ground circuit for this method to work. This provides an additional benefit of reduced settling time of the impedance signal, resulting in rapid impedance results. Therefore the integrated switch array 230 and channel impedance source 280 provide a benefit over existing designs wherein both the patient ground electrode and reference electrode have to be switched in order to make the impedance measurement.

The I/O ports 260, 262 enable two-way communication of the switching module 206 with the computing device 150 through the power module 155 while also connecting the recording device 205 with other recording devices (such as the recording devices 105a, 105b, 105c, 105d) in the system 100. It should be appreciated that the I/O ports 260, 262 are representative of the first pair of I/O ports 120a, 120b, 120c, 120d. Thus, in various embodiments, the recording devices and their respective switching modules are in communication with the computing device 150 through the power module 155.

An I/O link 207 connects the array of switches 230 with first and second input/output ports 235, 236 of the recording device 205 (it should be appreciated that the first and second input/output ports 235, 236 are representative of any of the second pair of I/O ports 160a, 160b, 160c and 160d of FIG. 1A). The link 207 connects the global common reference between recording devices in the system through first and second I/O ports 235, 236. Consequently, in some embodiments, the reference switch matrix 212, under programmatic instructions from the switching module 190, enables any one of the patient connections or electrodes 210 to function as a common reference for the recording device 205. Switch array 230 can further be configured, under programmatic instructions from the switching module 190, to use the common reference for the recording device 205 as a global common reference for (one, multiple or all) other recording devices in the system 100.

As known to persons of ordinary skill in the art, neurological studies, such as EEG, require a physical common reference electrode/connection. The signal on each active or sensing electrode is the difference between the electric potential at that sensing electrode and at the location of the common reference electrode. The position of a common reference electrode should not be close to that of an electrode in the area of interest so that it is free from activity of a neural source to prevent contamination of the active electrode sites. In conventional systems, if an electrode selected for the common reference is found to be in an area of activity or if the reference electrode is damaged, has high impedance or falls off, the user must unplug the bad reference lead from the device, select another connected electrode and attach that to the reference input on the device.

However, in accordance with an aspect of the present specification, under programmatic instructions from the switching module 190, the switch matrix module 206 may be programmed to enable any other connected electrode to be selected as the common reference. This eliminates the need for manual intervention by the user to access the equipment and/or approach the surgical zone in operating room cases to replace or physically move a bad or noisy reference electrode lead.

Conventionally, large channel-count systems with multiple recording devices use electrode wires to attach the common reference inputs on each device to each other and to the patient. These connections are prone to breakage or can get disconnected due to movement of the equipment and/or the patient, particularly during a seizure. They also subject these conventional systems to electrical interference due to high impedance of the input which is more sensitive to noise, and lack of shielding in the electrode wire. As understood by persons of ordinary skill in the art, high impedance sources are undesirable because even a small current on the source can generate large noise voltages.

In accordance with another aspect of the present specification, in some embodiments, the reference switch matrix 212, under programmatic instructions from the switching module 190, utilizes the array of switches 230 and buffer 225 to enable a selected common reference electrode (from any of the patient connections or electrodes 210), for the recording device 205, to also function as a global common reference to any one, multiple or all other recording devices in the system 100 via board-to-board or rugged, high-reliability cable connections (such as, the connections at I/O ports 160*a*, 160*b*, 160*c* and 160*d*) with locking connectors. In embodiments, the selected common reference electrode is connected to the voltage buffer amplifier 225 which provides a low impedance interface to the connections in the high channel count system 100 and prevents the connections from affecting the reference with noise or circuit loading. This addresses the problems of reliability and signal quality of the common reference connection and cable management (by eliminating the need for external physical jumpers between modules) between the recording devices 105 of the system 100.

In accordance with another aspect of the present specification, in some embodiments, the switch matrix module 206 (under programmatic instructions from the switching module 190) enables electrodes used for ground and/or common reference to be additionally used as sensing electrodes to, for example, record EEG signals. Prior art systems lack this flexibility and maneuverability to record signals from an electrode used for patient ground or a fixed common reference connection.

In some embodiments, the first I/O port 235 is also connected with the neurostimulator module 115 (FIG. 1A) through links 215*a*, 215*b*. The link 215*a* forms an input from the neurostimulator module 115 to a programmable anode switch matrix 240 while the link 215*b* form an input from the neurostimulator module 115 to a programmable cathode switch matrix 242. An output link 216*a* connects the anode switch matrix 240 to the plurality of patient connections or electrodes 210 while another output link 216*b* connects the cathode switch matrix 242 to the plurality of patient connections or electrodes 210. Links 215*a*, 215*b* also branch out into the second I/O port 236 to other recording devices in the system 100.

Accordingly, under programmatic instructions from the switching module 190, the anode and cathode switch matrices 240, 242 enable any one or combination(s) of the plurality of electrodes 210 to be connected to anode and/or cathode links 215*a*, 215*b* of the neurostimulator module 115 for delivering stimulation, such as for mapping of the patient's brain through multi-contact cortical stimulation. Thus, the anode and cathode switch matrices 240, 242, under programmatic instructions from the switching module 190, enable the selection of any connected patient electrode(s) as the anode and/or cathode for the stimulus, enabling a user to create multi-contact cortical stimulation by stimulating more than two electrodes at a single time. This overcomes the problem for the user to physically move the neurostimulator outputs to other locations on the patient 101. Additionally, it allows stimulation from one or more anodes to one or more cathodes which can help locate areas of interest or find an optimal stimulation site.

Persons of ordinary skill in the art would appreciate that iEEG (Intracranial EEG) procedures, such as ECoG and sEEG studies, use cortical stimulation mapping to locate areas of the brain responsible for sensory, motor and speech functions prior to surgery. In some prior art systems, a team of physicians and technicians perform mapping by selecting two electrodes, attaching the electrodes to the output of a neurostimulator and stimulating between the two electrodes at various intensities and durations to elicit a response or disrupt speech patterns. This continues by disconnecting the current pair of electrodes and connecting a new pair until the area of interest is mapped. In some prior art systems, a stimulation switch matrix is used but the matrix is not integrated into the recording device therefore requiring additional equipment to perform cortical mapping and affecting the stimulator signal due to an increased capacitance between devices.

In accordance with aspects of the present specification, the system 100 integrates the neurostimulator 115 and the switch matrix module 206 into the recording device 205 (that is, in broader terms, the system 100 integrates the neurostimulator 115 and the switch matrix modules 106*a*, 106*b*, 106*c*, 106*d* into the respective recording devices 105*a*, 105*b*, 105*c* and 105*d*). This integration not only simplifies the cortical mapping system but also allows for tightly synchronized switching between the neurostimulator 115 and recording matrices. It should be appreciated that this is beneficial for detecting seizure activity caused by the stimulus as it allows the user to monitor EEG signals between neurostimulator pulses at high repetition rates.

Additionally, the system 100 allows the user to select one or more anodes and one or more cathodes in a single recording device 205 or across multiple recording devices (such as the recording devices 105*a*, 105*b*, 105*c*, 105*d*), using programmatic instruction from the switching module 190, to connect the neurostimulator 115 to contacts/electrodes in an area of interest, thereby, simplifying the cortical mapping procedure. Using multiple anodes and/or cathodes enables quick localization of functional areas of the brain by stimulating a larger area with one stimulus.

Referring now to FIG. 1A, in some embodiments, a first subset of the plurality of electrodes 110 may be configured to function in the stimulation mode while a second subset of the plurality of electrodes 110 may be configured to function in the sensing mode. In the sensing mode, a first portion of the second subset of electrodes may be connected to the patient's brain or cortex for EEG monitoring whereas a second portion of the second subset of electrodes may be connected to other parts or muscle sites of the patient's body to record MEP (Motor Evoked Potential) activity.

For cortical stimulation mapping, which is typically performed after long-term monitoring of seizure activity (several days up to several weeks after electrode are placed) the switch matrix modules 106*a*, 106*b*, 106*c* and 106*d*, under programmatic instruction from the switching module 190, configure any one or combination(s) of the plurality of electrodes 110 (across the recording devices 105*a*, 105*b*, 105*c*, 105*d*) to be connected to anode and/or cathode outputs of the neurostimulator module 115, to function in the stimulation mode. Thereafter the stimulation module 180 implements a plurality of instructions to program the neurostimulator 115 to deliver a plurality of pre-stored stimulation protocols or schedules (stored in the at least one database 152). In some embodiments, the sensing module 175 generates a plurality of graphical user interfaces (GUIs) rendered on one or more display units 151 to display a plurality of EEG or MEP activity waveforms sensed by one or more of the plurality of electrodes 110 configured to be in the sensing mode.

In embodiments, the stimulation module 180 may also enable user-interaction with the system 100 (via a plurality of GUIs, for example) to perform a plurality of functions such as, but not limited to, selecting and activating/initiating one or more pre-stored stimulation protocols and modulating one or more stimulation parameters (such as, but not limited to, stimulation pulse frequency, pulse width, and current or voltage amplitude of the pulses) of the protocols. In some embodiments, during cortical stimulation mapping procedures, the stimulation module 180 is programmed to apply one or more stimulation protocols to one or more nerve structures of the patient 101 through electrodes configured in the stimulation mode while the sensing module 175 acquires and records corresponding EEG or MEP activity through electrodes configured in the sensing mode and positioned within a plurality of muscle sites or locations of the patient 101.

It should be appreciated by those of ordinary skill in the art that, although described herein with reference to cortical stimulation mapping (CSM), electroencephalography (EEG) and motor evoked potential monitoring (MEP) during long term monitoring for epilepsy (LTM) and/or cerebrospinal surgical procedures, the system 100 and related methods or use cases of the present specification have application in a plurality of surgical procedures during which tissue having critical neural structures must be approached, retracted, and/or impinged upon. There is a requirement that such physically invasive procedures be planned and executed while preserving critical neural structures or bundles. It should also be appreciated that, although embodiments have been described herein with reference to EEG and MEP activity, the system 100 and related methods or use cases of the present specification may, in various alternate embodiments, use a plurality of different types of neural monitoring modalities such as, for example, triggered electromyography, spontaneous electromyography, somatosensory evoked potential, nerve conduction velocity and/or train of fours.

The above examples are merely illustrative of the many applications of the system and method of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

We claim:

1. A neuromonitoring system comprising:
 at least one multi-channel recording device comprising a programmable switch matrix and a plurality of input channels;
 a plurality of electrodes connected to the at least one multi-channel recording device via the plurality of input channels;
 at least one stimulator module in communication with the at least one multi-channel recording device;
 at least one computing device configured to execute a switching module and in communication with the at least one multi-channel recording device; and
 at least one display unit in data communication with the at least one computing device, wherein the programmable switch matrix is configured, in response to commands from the switching module executed by the at least one computing device, to:
  enable any electrode or combination of electrodes of the plurality of electrodes to be selectively connected to any input channel or combination of input channels of the at least one multi-channel recording device as a sensing input;
  enable any electrode or combination of electrodes of the plurality of electrodes to be programmatically designated as a common reference electrode or a global common reference electrode without requiring movement of the electrode location on a patient;
  enable any electrode or combination of electrodes of the plurality of electrodes to be programmatically designated as a patient ground electrode; and
  enable any electrode or combination of electrodes of the plurality of electrodes to be configured as a stimulation anode or cathode to support multi-cortical stimulation, wherein said multi-cortical stimulation comprises stimulating more than two electrodes simultaneously, without requiring a user to manually move electrode locations on the patient.

2. The neuromonitoring system of claim 1, further comprising at least one database in data communication with the at least one computing device.

3. The neuromonitoring system of claim 1, wherein the at least one computing device is configured to automatically command, without manual intervention by the user, the programmable switch matrix to enable any electrode or combination of electrodes of the plurality of electrodes to function as a patient ground electrode when a previously designated patient ground electrode is damaged or disconnected.

4. The neuromonitoring system of claim 1, comprising two or more multi-channel recording devices.

5. The neuromonitoring system of claim 4, wherein the programmable switch matrix is configured, in response to commands from the at least one computing device, to enable any electrode or combination of electrodes of the plurality of electrodes to function as said global common reference for each of the two or more multi-channel recording devices.

6. The neuromonitoring system of claim 1, wherein the at least one computing device further comprises a sensing module.

7. The neuromonitoring system of claim 1, wherein the switching module is adapted to configure the programmable switch matrix to enable any electrode or combination of electrodes of the plurality of electrodes to selectively operate in a sensing mode or a stimulation mode.

8. The neuromonitoring system of claim 1, further comprising a power module in communication with the at least one multi-channel recording device and the at least one computing device.

9. The neuromonitoring system of claim 1, wherein the at least one display unit is configured to generate a graphical user interface comprising a plurality of inputs, wherein each of the plurality of inputs is adapted to receive a user input that designates a function of each electrode of the plurality of electrodes.

10. The neuromonitoring system of claim 1, wherein the programmable switch matrix is configured to measure ground impedance without switching the common reference electrode or the global common reference electrode into a ground circuit.

11. The neuromonitoring system of claim 1, wherein the programmable switch matrix comprises a plurality of electromechanical switches.

12. The neuromonitoring system of claim 1, wherein the programmable switch matrix comprises at least one of a double-pole switch or a single-throw switch.

13. The neuromonitoring system of claim 1, wherein the programmable switch matrix comprises at least one of a field effect transistor or bipolar junction transistor.

14. The neuromonitoring system of claim 1, wherein the at least one multi-channel recording device is configured to measure inputs to at least some of the plurality of electrodes in relation to the common reference electrode.

* * * * *